(12) United States Patent
Imagawa et al.

(10) Patent No.: US 7,917,252 B2
(45) Date of Patent: Mar. 29, 2011

(54) LOAD CONTROLLING DEVICE, LOAD CONTROLLING METHOD, LOAD CONTROLLING CIRCUIT, LOAD CONTROLLING PROGRAM, AND COMPUTER-READABLE RECORDING MEDIUM WHERE LOAD CONTROLLING PROGRAM IS RECORDED

(75) Inventors: Tsuneko Imagawa, Osaka (JP); Shigeaki Matsubayashi, Nara (JP)

(73) Assignee: Panasonic Corporation, Osaka (JP)

( * ) Notice: Subject to any disclaimer, the term of this patent is extended or adjusted under 35 U.S.C. 154(b) by 720 days.

(21) Appl. No.: 11/917,476

(22) PCT Filed: Apr. 17, 2006

(86) PCT No.: PCT/JP2006/308039
§ 371 (c)(1),
(2), (4) Date: Dec. 13, 2007

(87) PCT Pub. No.: WO2006/134719
PCT Pub. Date: Dec. 21, 2006

(65) Prior Publication Data
US 2010/0023176 A1    Jan. 28, 2010

(30) Foreign Application Priority Data

Jun. 16, 2005 (JP) .................. 2005-175934

(51) Int. Cl.
*G05D 9/00* (2006.01)
*H01M 10/50* (2006.01)
(52) U.S. Cl. ........ 700/288; 700/291; 700/295; 422/105; 422/106; 422/110; 320/101; 429/430; 429/433; 429/436
(58) Field of Classification Search ................ 700/9, 14, 700/16, 22, 28, 36, 274, 275, 286, 288, 291, 700/295, 297; 422/105, 106, 110; 705/412; 320/101; 429/430, 433, 436
See application file for complete search history.

(56) References Cited

U.S. PATENT DOCUMENTS

| 5,432,710 | A   | 7/1995 | Ishimaru et al. |
|-----------|-----|--------|-----------------|
| 6,904,337 | B2* | 6/2005 | Ueda et al. .................... 700/295 |
| 7,567,859 | B2* | 7/2009 | Subramanian et al. ....... 700/288 |

FOREIGN PATENT DOCUMENTS

| JP | 6-86463   | 3/1994 |
|----|-----------|--------|
| JP | 2001-68126 | 3/2001 |

(Continued)

OTHER PUBLICATIONS

International Search Report issued Jul. 18, 2006 in the International Application No. PCT/JP2006/308039.

*Primary Examiner* — Paul L Rodriguez
*Assistant Examiner* — Sheela Rao
(74) *Attorney, Agent, or Firm* — Wenderoth, Lind & Ponack, L.L.P.

(57) ABSTRACT

A post-control electric power amount curve generating portion generates plural pieces of running control information indicating a changeable running method for each device and plural post-control electric power amount curves indicating an amount of main electric power. A post-control hot water storage amount curve generating portion generates post-control hot water storage amount curves each indicating an accumulated amount of hot water generated in a case where the fuel cell generates electric power based on the plural post-control electric power amount curves. A hot water storage completion determining portion determines whether the accumulated amounts exceed a specific heat capacity. A reduction amount calculating portion calculates plural energy cost reduction amounts produced before and after the change using the post-control hot water storage amount curves determined as not exceeding the specific heat capacity. A running method determining portion determines the running control information corresponding to the largest energy cost reduction amount.

15 Claims, 21 Drawing Sheets

FOREIGN PATENT DOCUMENTS

| | | |
|---|---|---|
| JP | 2002-281568 | 9/2002 |
| JP | 2003-28449 | 1/2003 |
| JP | 2003-153449 | 5/2003 |
| JP | 2005-56639 | 3/2005 |

* cited by examiner

FIG.3

CONTROL CONDITION INFORMATION

| DEVICE ID | DEVICE NAME | SHIFT FLAG | START TIME | END TIME |
|---|---|---|---|---|
| 01 | DISH WASHER AND DRYER | 1 | 21:00 | 6:00 |
| 02 | WASHING MACHINE | 1 | 4:00 | 17:00 |
| . | . | . | . | . |
| . | . | . | . | . |
| n | RICE COOKER | 0 | NULL | NULL |

FIG.4

CONTROL CONDITION INFORMATION
AND RESTRICTION RELEASING CONDITION INFORMATION

| DEVICE ID | DEVICE NAME | SHIFT FLAG | START TIME | END TIME | RESTRICTION RELEASING CONDITION | |
|---|---|---|---|---|---|---|
| | | | | | START TIME | END TIME |
| 01 | DISH WASHER AND DRYER | 1 | 21:00 | 6:00 | -2:00 | +4:00 |
| 02 | WASHING MACHINE | 1 | 4:00 | 17:00 | -2:00 | +1:00 |
| . | . | . | . | . | . | . |
| . | . | . | . | . | . | . |
| n | RICE COOKER | 0 | NULL | NULL | -2:00 | +2:00 |

FIG.5

AVERAGE MAIN ELECTRIC POWER AMOUNT CURVE

| TIME | 0 | 1 | 2 | 3 | 4 | 5 | 6 | 7 | 8 | 18 | 19 | 20 | 21 | 22 | 23 |
|---|---|---|---|---|---|---|---|---|---|---|---|---|---|---|---|
| AMOUNT OF ELECTRIC POWER | 0.40 | 0.30 | 0.30 | 0.25 | 0.30 | 0.30 | 0.40 | 0.50 | 0.80 | 0.55 | 1.35 | 1.20 | 1.60 | 1.20 | 0.45 |

AVERAGE HOT WATER STORAGE AMOUNT CURVE

| TIME | 0 | 1 | 2 | 3 | 4 | 5 | 6 | 7 | 8 | 18 | 19 | 20 | 21 | 22 | 23 |
|---|---|---|---|---|---|---|---|---|---|---|---|---|---|---|---|
| AMOUNT OF HOT WATER STORAGE | 0.00 | 0.00 | 0.00 | 0.00 | 0.00 | 0.00 | 0.00 | 0.10 | 0.20 | 7.50 | 8.00 | 9.00 | 0.00 | 1.00 | 0.00 |

FIG.7

AVERAGE FC START-STOP STATE

| TIME | 0 | 1 | 2 | 3 | 4 | 5 | 6 | 7 | 8 | 18 | 19 | 20 | 21 | 22 | 23 |
|------|---|---|---|---|---|---|---|---|---|----|----|----|----|----|----|
| STATE | 0.0 | 0.0 | 0.0 | 0.0 | 0.0 | 0.0 | 0.0 | 0.6 | 0.8 | 1.0 | 1.0 | 1.0 | 1.0 | 1.0 | 1.0 |

FIG.9

BASE MAIN ELECTRIC POWER AMOUNT CURVE

| TIME | 0 | 1 | 2 | 3 | 4 | 5 | 6 | 7 | 8 | 18 | 19 | 20 | 21 | 22 | 23 |
|---|---|---|---|---|---|---|---|---|---|---|---|---|---|---|---|
| AMOUNT OF ELECTRIC POWER | 0.40 | 0.30 | 0.30 | 0.25 | 0.30 | 0.30 | 0.40 | 0.50 | 0.45 | 0.55 | 1.35 | 0.80 | 1.60 | 1.00 | 0.45 |

FIG.10

DEVICE OPERATION INFORMATION

| DEVICE ID | DEVICE NAME | AVERAGE OPERATION START TIME | AVERAGE REQUIRED TIME | AVERAGE AMOUNT OF DEVICE ELECTRIC POWER | | | AVERAGE AMOUNT OF DEVICE HOT WATER SUPPLY | | |
|---|---|---|---|---|---|---|---|---|---|
| | | | | 0 | 1 | 2 | 0 | 1 | 2 |
| 01 | DISH WASHER AND DRYER | 21:00 | 92 | 10 | 50 | 50 | 0 | 821 | 667 |
| 02 | WASHING MACHINE | 8:00 | 172 | 72 | 72 | 45 | | | |
| . | . | . | . | . | . | . | | | |
| . | . | . | . | . | . | . | | | |
| n | RICE COOKER | 5:00 | 42 | 814 | 912 | 950 | 0 | 0 | 0 |

FIG.11

RUNNING CONTROL INFORMATION

| DEVICE ID | DEVICE NAME | START TIME |
|---|---|---|
| 01 | DISH WASHER AND DRYER | 21:00 |
| 02 | WASHING MACHINE | 14:00 |
| . | . | . |
| . | . | . |
| n | RICE COOKER | NULL |

FIG.12

POST-CONTROL ELECTRIC POWER AMOUNT CURVE

| TIME | 0 | 1 | 2 | 3 | 4 | 5 | 6 | 7 | 8 | 18 | 19 | 20 | 21 | 22 | 23 |
|---|---|---|---|---|---|---|---|---|---|---|---|---|---|---|---|
| AMOUNT OF ELECTRIC POWER | 0.40 | 0.30 | 0.30 | 0.25 | 0.30 | 0.30 | 0.40 | 0.50 | 0.45 | 0.55 | 1.35 | 0.80 | 1.60 | 1.00 | 0.45 |

FIG.20

NOVEMBER 14, MONDAY 9:17

CHANGE OF OPERATION TIME OF DEVICE

| | SET-UP TIME | NEW SET-UP TIME |
|---|---|---|
| WASHING AND DRYING MACHINE | 8:30~14:00 | 8:30~17:00 |

SET-UP    CANCEL

110

111

ENERGY MONITOR | USAGE GRAPH | DEVICE CONTROL | ECOLOGICAL ADVICE

LOAD CONTROLLING DEVICE, LOAD CONTROLLING METHOD, LOAD CONTROLLING CIRCUIT, LOAD CONTROLLING PROGRAM, AND COMPUTER-READABLE RECORDING MEDIUM WHERE LOAD CONTROLLING PROGRAM IS RECORDED

TECHNICAL FIELD

The present invention relates to a load controlling device, a load controlling method, a load controlling circuit, a load controlling program, and a computer-readable recording medium where the load controlling program is recorded for a fuel cell system that supplies electric power and thermal energy, and more particularly, to a load controlling device, a load controlling method, a load controlling circuit, a load controlling program, and a computer-readable recording medium where the load controlling program is recorded for a fuel cell system for household use.

BACKGROUND ART

A fuel cell generates electric power using a fuel gas, and because the fuel cell is able to generate thermal energy used as hot water supply heat at the same time when it generates electric power, enhancement of energy efficiency can be achieved.

A conventional load controlling device for a fuel cell increases efficiency of the fuel cell by controlling devices that consume electric power and hot water supply heat supplied by the fuel cell (for example, see Patent Document 1). For example, in a case where an amount of electric power generation by the fuel cell is different from an amount of main power electricity, which is an amount of electric power for an entire house, devices consuming electric power are controlled to run or stop, so that an amount of main electric power and an amount of electric power generation are maintained at the same amount. In addition, because the fuel cell generates thermal energy when it generates electric power, it becomes unable to generate electric power unless the generated heat is removed. To this end, the fuel cell is provided with a hot water storage tank to use thermal energy for a supply of hot water. In a case where an amount of hot water storage in the hot water storage tank exceeds the maximum capacity, devices consuming hot water supply heat are controlled to run for consuming thermal energy.

FIG. 21 is a block diagram showing the configuration of a conventional load controlling device described in Patent Document 1. Referring to FIG. 21, a load controlling device 203 acquires an amount of main electric power, which is an amount of electric power consumption by an entire house, an amount of electric power generation by a fuel cell main body 201, and an amount of hot water storage in the hot water storage tank from the fuel cell main body 201, and acquires an operating time, an amount of electric power consumption, and an amount of hot water usage from devices 202.

An electric power demand predicting portion 204 predicts an electric power demand, and outputs a predicted amount of electric power to a consumption control portion 206 together with the amount of main electric power acquired from the fuel cell main body 201. In a case where the amount of main electric power is different from the amount of electric power generation, the consumption control portion 206 outputs a control signal to the devices 202 so that they are run to make the amount of main electric power equal to the amount of electric power generation. Also, a hot water supply demand predicting portion 205 predicts a hot water supply demand, and outputs the predicted amount of hot water supply to a heat control portion 207 together with the amount of hot water storage acquired from the fuel cell main body 201. In a case where the amount of hot water storage exceeds the tank capacity, the heat control portion 207 outputs a control signal to the devices 202 so that they are run to reduce the amount of hot water storage for enabling the fuel cell 201 to operate continuously.

In the prior art described above, however, in a case where a control method of devices consuming electric power is determined, it is determined on the basis of the amount of main electric power and the amount of electric power generation alone, and no consideration is given to thermal energy that is newly generated when the control method is changed. By merely controlling devices so as to make the amount of main electric power equal to the amount of electric power generation, there may be a case where thermal energy is generated in an amount exceeding an amount of thermal energy used by the user. In addition, in a case where converted thermal energy is so large that it exceeds the tank capacity, thermal energy has to be released or when thermal energy cannot be released, the fuel cell has to be stopped until the tank becomes available owing to hot water supply load, which possibly compromises energy saving.

Another problem of the prior art described above is raised by the configuration in which devices are classified into devices consuming electric power and devices consuming hot water supply heat and the devices consuming electric power are controlled according to the amount of main electric power while the devices consuming hot water supply heat are controlled according to the amount of hot water storage. Household electric appliance, however, includes devices consuming both hot water supply heat and electric power. In a case where such a device is controlled, even when a device consuming both hot water and electric power is started immediately before hot water reaches the full tank capacity in avoiding such an event, thermal energy generated from the fuel cell increases because the fuel cell generates electric power in response to an increase of the amount of main electric power. Hence, there may be a case where it is impossible to avoid an event that an amount of hot water storage reaches the full capacity. In other words, because an amount of hot water supply heat consumption and an amount of electric power consumption by the devices are taken into account separately in the conventional load controlling device, there may be a possibility that the load controlling device fails to enhance energy saving.

Patent Document 1: JP-A-2001-68126

DISCLOSURE OF THE INVENTION

The invention was devised to solve the problems in the prior art discussed above, and therefore has an object to provide a load controlling device, a load controlling method, a load controlling circuit, and a load controlling program capable of enhancing energy saving and economical efficiency, as well as a computer-readable recording medium where the load controlling program is recorded.

A load controlling device according to an aspect of the invention includes: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A load controlling method according to another aspect of the invention includes: an information acquiring step of acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating step of generating plural pieces of running control information each indicating a changeable running method for each device on the basis of the control condition information acquired in the information acquiring step, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired in the information acquiring step; a post-control hot water storage amount data generating step of generating plural items of post-control hot water storage amount data each indicating an accumulated amount of hot water for every specific time generated in a case where a fuel cell generates electric power on the basis of the plural items of post-control electric power amount data generated in the post-control electric power amount data generating step; a hot water storage amount determining step of determining whether the accumulated amounts within the plural items of post-control hot water storage amount data generated in the post-control hot water storage amount data generating step exceed a specific heat capacity; a reduction amount calculating step of calculating plural energy cost reduction amounts indicating respective differences between plural energy costs, incurred in response to the plural items of post-control hot water storage amount data determined as not exceeding the specific heat capacity in the hot water storage amount determining step and the plural items of post-control electric power amount data corresponding to the plural items of post-control hot water storage amount data, and an energy cost incurred in response to the amount of main electric power before the running method of the device is changed; and a running method determining step of determining, as the running method of the device, the running control information corresponding to a largest energy cost reduction amount, which is largest among the plural energy cost reduction amounts calculated in the reduction amount calculating step.

A load controlling program according to still another aspect of the invention causes a computer to function as: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding to the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A computer-readable recording medium where a load controlling program is recorded according to still another aspect of the invention has recorded therein a load controlling program that causes a computer to function as: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding to the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A load controlling circuit according to still another aspect of the invention includes: a post-control electric power amount data generating circuit for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device, generating plural pieces of running control information each indicating a changeable running method for each device on the basis of the control condition information that has been acquired, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information that have been acquired; a post-control hot water storage amount data generating circuit for generating plural items of post-control hot water storage amount data each indicating an accumulated amount of hot water for every specific time generated in a case where a fuel cell generates electric power on the basis of the plural items of post-control electric power amount data generated by the post-control electric power amount data generating circuit; a hot water storage amount determining circuit for determining whether the accumulated amounts within the plural items of post-control hot water storage amount data generated by the post-control hot water storage amount data generating circuit exceed a specific heat capacity; a reduction amount calculating circuit for calculating plural energy cost reduction amounts indicating respective differences between plural energy costs, incurred in response to the plural items of post-control hot water storage amount data determined as not exceeding the specific heat capacity by the hot water storage amount determining circuit and the plural items of post-control electric power amount data corresponding to the plural items of post-control hot water storage amount data, and an energy cost incurred in response to the amount of main electric power before the running method of the device is changed; and a running method determining circuit for determining, as the running method of the device, the running control information corresponding to a largest energy cost reduction amount, which is largest among the plural energy cost reduction amounts calculated by the reduction amount calculating circuit.

According to these configurations, an amount of main electric power indicating an amount of electric power for an entire entity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device are acquired. Subsequently, plural pieces of running control information each indicating a changeable running method for each device are generated on the basis of the control condition information, and plural items of post-control electric power amount data, each indicating the amount of main electric power for every specific time obtained in a case where the running method of the device is changed in response to the plural pieces of running control information, are generated on the basis of the amount of main electric power, the fuel cell operation information, and the device operation information. Subsequently, plural items of post-control hot water storage amount data, each indicating an accumulated amount of hot water for every specific time generated in a case where the fuel cell generates electric power, are generated on the basis of the plural items of post-control electric power amount data, and whether the accumulated amounts within the plural items of post-control hot water storage amount data exceed a specific heat capacity is determined. Plural energy cost reduction amounts are then calculated, which indicate respective differences between plural energy costs, incurred in response to the plural items of post-control hot water storage amount data determined as not exceeding the specific heat capacity and the plural items of post-control electric power amount data corresponding to the plural items of post-control hot water storage amount data, and an energy cost incurred in response to the amount of main electric power before the running method of the device is changed. The running control information corresponding to the largest energy cost reduction amount, which is the largest among the plural energy cost reduction amounts, is determined as the running method of the device.

Because an amount of hot water storage that varies with a change of the running method is calculated by taking into account hot water supply heat used by the device and the running method of the device by which an amount of post-control hot water storage does not exceed the specific heat capacity is determined, hot water will not be stored in an excessive amount. It is thus possible to prevent an event that heat is released or the fuel cell is stopped, which can enhance energy saving and economical efficiency.

The above and other objects, features, and advantages of the invention will become more apparent from the following detailed description with reference to the accompanying drawings.

BRIEF DESCRIPTION OF THE DRAWINGS

FIG. 3 is a view showing an example of control condition information of the embodiment.

FIG. 4 is a view showing an example of the control condition information and restriction releasing condition information stored in a control condition database of the embodiment.

FIG. 5 is a view showing an example of an average main electric power amount curve of the embodiment.

FIG. 7 is a view showing an example of an average FC start-stop state of the embodiment.

FIG. 9 is a view showing an example of a base main electric power amount curve of the embodiment.

FIG. 10 is a view showing an example of device operation information of the embodiment.

FIG. 11 is a view showing an example of running control information of the embodiment.

FIG. 12 is a view showing an example of a post-control electric power amount curve of the embodiment.

FIG. 20 is a view showing an example of a time change screen displayed on the display operation portion of the embodiment.

BEST MODE FOR CARRYING OUT THE INVENTION

Hereinafter, one embodiment of the invention will be described with reference to the drawings.

Figure 1:
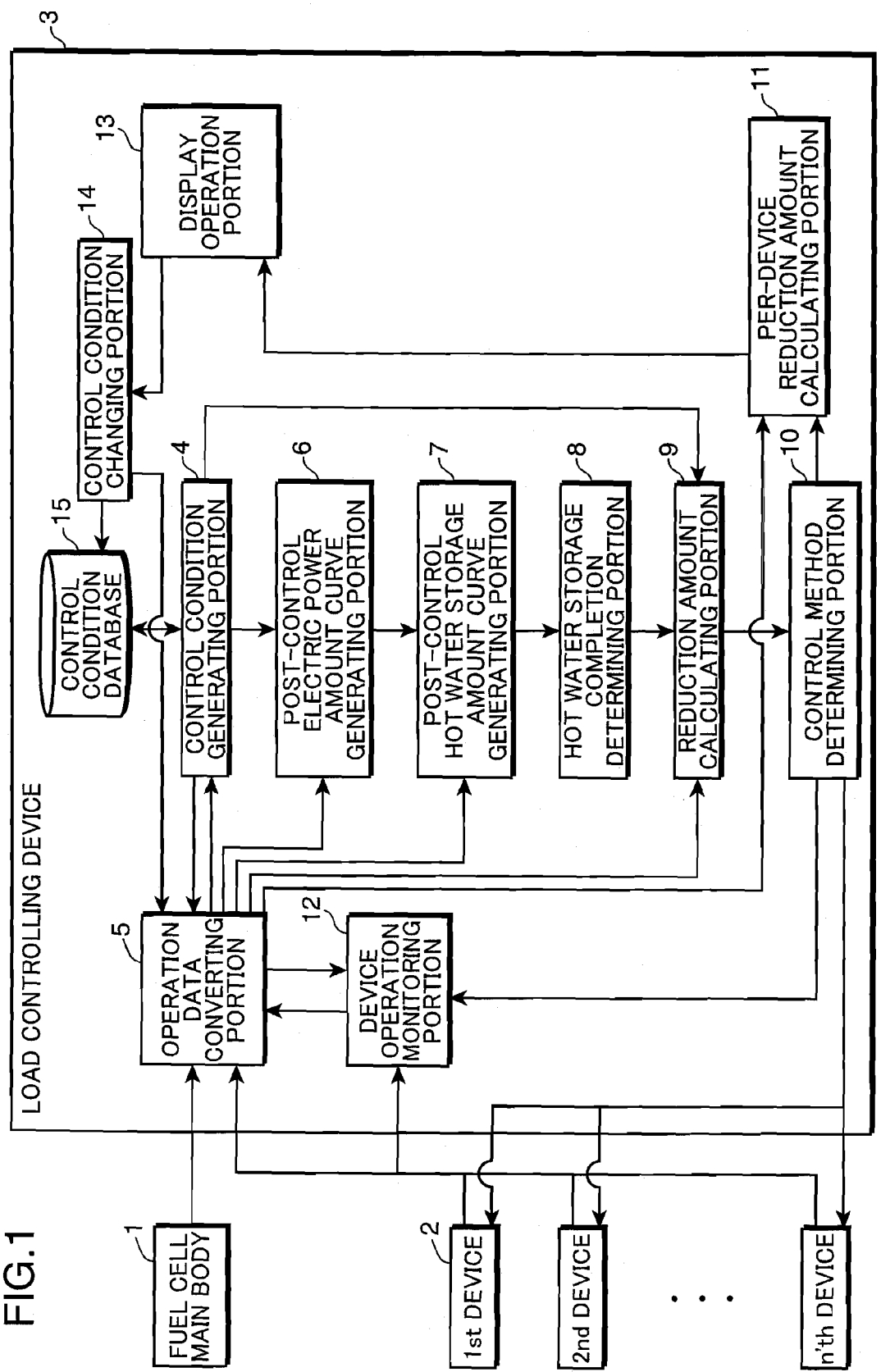
FIG. 1 is a block diagram showing the configuration of a load controlling device according to one embodiment of the invention.

FIG. 1 is a block diagram showing the configuration of a load controlling device according to one embodiment of the invention. Referring to FIG. 1, a fuel cell main body 1 supplies both electric power and hot water supply heat. A device 2 is at least one device that consumes at least one of electric power and hot water supply heat. A load controlling device 3 of the invention includes a control condition generating portion 4, an operation data converting portion 5, a post-control electric power amount curve generating portion 6, a post-control hot water storage amount curve generating portion 7, a hot water storage completion determining portion 8, a reduction amount calculating portion 9, a control method determining portion 10, a per-device reduction amount calculating portion 11, a device operation monitoring portion 12, a display operation portion 13, a control condition changing portion 14, and a control condition database 15.

The display operation portion 13 is incorporated into the load controlling device 3 or provided in the form of an accessory, such as a remote controller. It displays various kinds of information and accepts an input of data by the user. The control condition changing portion 14 saves control conditions of devices acquired through inputs by the user from the display operation portion 13 into the control condition database 15. The control condition generating portion 4 acquires control condition information from the control condition database 15 and generates operation time zones of the devices. The operation data converting portion 5 acquires operation information of the fuel cell from the fuel cell main body 1, acquires operation information of devices from the devices 2, and acquires the control conditions of devices from the control condition generating portion 4 to convert data into a desired format.

The post-control electric power amount curve generating portion 6 generates time-series data of main electric power after the running control. The post-control hot water storage amount curve generating portion 7 generates time-series data of an amount of hot water storage within the tank after the running control. The hot water storage completion determining portion 8 determines whether an amount of hot water storage exceeds the tank capacity. The reduction amount calculating portion 9 calculates a reduction amount of charges or a reduction amount of $CO_2$ emission between before and after the running control of each device. The control method determining portion 10 determines a control method of the device that achieves a largest reduction amount. The per-device reduction amount calculating portion 11 calculates a reduction amount of charges or a reduction amount of $CO_2$ emission for each device achieved by changing the operation start time of the device 2. The device operation monitoring portion 12 monitors operation states of the devices 2. The functions of the respective portions will be described more in detail below.

The fuel cell main body 1 outputs an amount of main electric power, which is electric power for an entire house, an amount of hot water storage indicating an amount of hot water supply heat accumulated in the tank, an FC start-stop state indicating start and stop states, and an amount of backup hot water usage, which is an amount of hot water usage by an instantaneous gas water heater attached to the fuel cell main body 1, to the operation data converting portion 5, for example, for every three seconds. Each device 2 outputs an amount of device electric power, which is an amount of consumed electric power, an amount of hot water usage, which is an amount of consumed hot water supply heat, and an operation start time to the operation data converting device 5.

The load controlling device 3 is formed of a CPU (Central Processing Unit), a RAM (Random Access Memory), a ROM (Read Only Memory), and so forth. By running the load controlling program pre-stored in the ROM, the CPU functions as the control condition generating portion 4, the operation data converting portion 5, the post-control electric power amount curve generating portion 6, the post-control hot water storage amount curve generating portion 7, the hot water storage completion determining portion 8, the reduction amount calculating portion 9, the control method determining portion 10, the per-device reduction amount calculating portion 11, the device operation monitoring portion 12, the control condition changing portion 14, and the control condition database 15.

In this embodiment, the operation data converting portion 5 corresponds to an example of the information acquiring portion, the post-control electric power amount curve generating portion 6 corresponds to an example of the post-control electric power amount data generating portion, the post-control hot water storage amount curve generating portion 7 corresponds to an example of the post-control hot water storage amount data generating portion, the hot water storage completion determining portion 8 corresponds to an example of the hot water storage amount determining portion, the reduction amount calculating portion 9 corresponds to an example of the reduction amount calculating portion, the control method determining portion 10 corresponds to an example of the running method determining portion, the control condition database 15 corresponds to an example of the control condition memory portion, the display operation portion 13 corresponds to an example of the control condition input accepting portion, the control condition changing portion 14 corresponds to an example of the control condition changing portion, the display operation portion 13 corresponds to an example of the restriction releasing input accepting portion, the per-device reduction amount calculating portion 11 corresponds to an example of the per-device reduction amount calculating portion, the display operation portion 13 corresponds to an example of the display portion, and the device operation monitoring device 12 corresponds to an example of the device operation monitoring portion.

Figure 2:
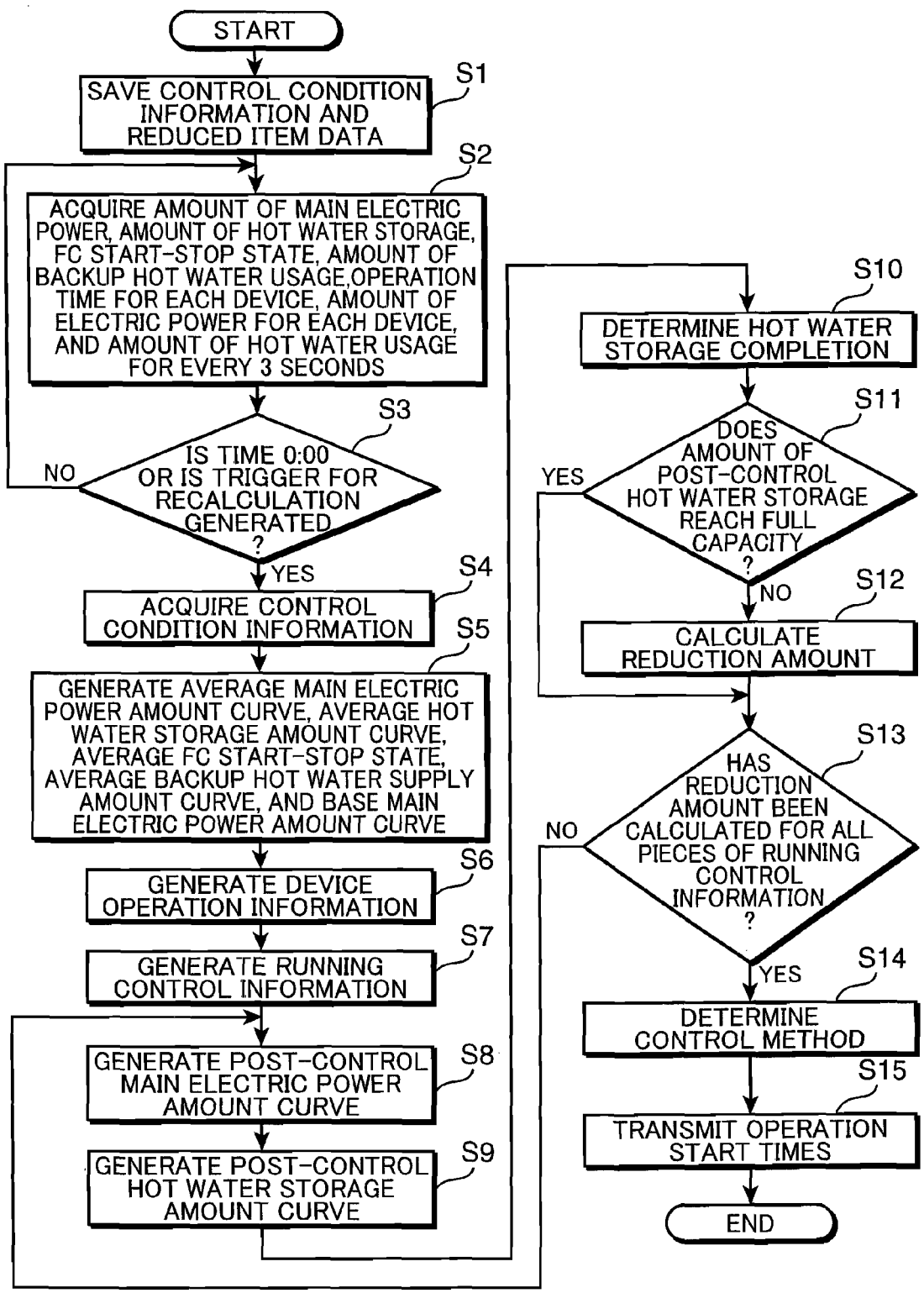
FIG. 2 is a flowchart used to describe an operation of the load controlling device shown in FIG. 1.

Operations of the respective functional blocks will now be described. FIG. 2 is a flowchart used to describe the operation of the load controlling device 4 shown in FIG. 1.

Initially, in Step S1, the control condition changing portion 14 acquires the control condition information and reduced item data inputted by the user from the display operation portion 13, and saves them into the control condition database 15. The control condition information is made up of a shift flag, which is a flag indicating whether the running is changeable, and time data indicating a range of time within which the operation start time is changeable for each device 2.

FIG. 3 is a view showing an example of the control condition information. In FIG. 3, the device ID indicates an identification number allocated to each device, the device name indicates a name of each device, the shift flag indicates whether the start time of each device is changeable, and the start time and the end time respectively indicate a start time and an end time of an allowable operation time of each device. Examples of the device 2 whose start time is changeable include a dish washer and dryer with the device ID of "01" and a washing machine with the device ID of "02". In a case where the device 2 is a dish washer and dryer, a time from 21:00 to 6:00 is inputted because the user wishes the dishes be washed during a time after dinner and before he starts preparing breakfast. In a case where the device 2 is a washing machine, a time from 4:00 to 17:00 is inputted because the user wishes the laundry be done in the daytime. When the shift flag exhibits '1', it indicates that the start time is changeable, and when the shift flag exhibits '0', it indicates that the start time is unchangeable. In addition, in a case where the shift flag exhibits '0', the start time and the end time indicate 'NULL'.

In the invention, the running method includes an operation start time, an operation period, a running mode, and so forth. This embodiment will describe a case where the operation start time is changed; however, the invention is not particularly limited to this case, and it is possible to change the operation period and the running mode.

The reduced item data, which is the other data the control condition changing portion 14 acquires, is the information indicating whether the subject to be reduced is the charges or an amount of $CO_2$ emission. The control condition changing portion 14 holds '0' in a case where the reduced item is the charges and holds '1' in a case where the reduced item is an amount of $CO_2$ emission. One of the reasons to select the reduced item is that an amount of $CO_2$ emission is not reduced substantially even for lower charges in some cases because of efficiency of the fuel cell or the rate structure of gas or commercial power.

Data saved in the control condition database 15 will now be described. Besides the control condition information and the reduced item data saved by the control condition changing portion 14, restriction releasing condition information for each device, which is the conditions to extend the operation time zones of devices inputted by the user, has been previously saved in the control condition database 15. The restriction releasing condition information is the information used to calculate the operation start times of the devices 2 to achieve a reduction of the charges or an amount of $CO_2$ emission by extending the operation start time zones in comparison with the operation start time zones inputted by the user.

FIG. 4 is a view showing an example of the control condition information and the restriction releasing condition information stored in the control condition database. Referring to FIG. 4, the device ID indicates an identification number allocated to each device, the device name indicates a name of each device, the shift flag indicates whether the start time of each device is changeable, the start time and the end time respectively indicate a start time and an end time, which is the operation start time zone inputted by the user, and the start time and the end time under the restriction releasing condition respectively indicate the conditions for the start time and the conditions for the end time to extend the operation start time zones. In FIG. 4, the start time indicates −2:00 and the end time indicates +4:00 under the restriction releasing conditions for the dish washer and dryer with the device ID of '01'. It is therefore indicated that the start time can be set two hours earlier and the end time can be set four hours later from the time zone the user has inputted by using these conditions.

The control condition generating portion 4 acquires the control condition information, the restriction releasing condition information, and the reduced item data from the control condition database 15, and acquires the device operation information from the operation data converting portion 5. The control condition generating portion 4 then generates released control condition information as the result of releasing the restriction imposed by the control condition information on the basis of the restriction releasing condition information. The released control condition information is obtained by extending the time from the operation start time to the operation end time of each device 2 contained in the control condition information on the basis of the restriction releasing condition information, and has the same data structure as the control condition information.

In a case where the released control condition information is generated on the basis of the control condition information and the restriction releasing condition information shown in FIG. 4, the operation start time of the dish washer and dryer with the device ID of '01' is released to 19:00 from 21:00 inputted by the user and the operation end time is released to 10:00 from 6:00 inputted by the user. Also, as is the rice cooker shown in FIG. 4, there is a device for which the user does not permit a change of the operation start time and the operation end time. In this case, the control condition generating portion 4 extracts the normal operation start time and operation end time for this device from the device operation information acquired from the operation data converting portion 5, and finds the operation start time and the operation end time by adding the operation start time and the operation end time contained in the restriction releasing condition information to the extracted times, after which it changes the corresponding shift flag to ON ('1'). The restriction condition generating portion 4 outputs the control condition information and the released control condition information to the operation data converting portion 5 and the post-control electric power amount curve generating portion 6, and outputs the reduced item data to the reduction amount calculating portion 9.

Referring to FIG. 2 again, in Step S2, the operation data converting portion 5 acquires an amount of main electric power, an amount of hot water storage, an FC start-stop state, and an amount of backup hot water usage from the fuel cell main body 1, for example, for every three seconds, and performs processing described below, for example, once a day to serve as a trigger for activating the functional blocks including the post-control electric power amount curve generating portion 6 and the following portions. Also, the operation data converting portion 5 acquires an amount of device electric power and an amount of hot water supply usage consumed by each device 2 and the operation time from the device 2.

Subsequently, in Step S3, the operation data converting portion 5 determines whether the current time is 0:00. When the operation data converting portion 5 determines that the current time is not 0:00, it returns to the processing in Step S2. Meanwhile, when the operation data converting portion 5 determines that the current time is 0:00, it proceeds to the processing in Step S4. In this embodiment, the operation data converting portion 5 determines whether the current time is 0:00; however, the invention is not particularly limited to this time, and a determination may be made as to whether the current time is any other time, for example, 3:00.

Subsequently, in Step S4, the operation data converting portion 5 acquires the control condition information from the control condition generating portion 4. To be more concrete, the operation data converting portion 5 outputs a control condition information acquisition instruction to the control condition generating portion 4, and the control condition generating portion 4, to which the control condition information acquisition instruction is inputted, reads out the control condition information from the control condition database 15 and outputs the read out information to the operation data converting portion 5.

Subsequently, in Step S5, the operation data converting portion 5 generates an average main electric power amount curve, an average hot water storage amount curve, an average FC start-stop state, an average backup hot water supply amount curve, and a base main electric power amount curve on the basis of the amount of main electric power, the amount of hot water storage, the FC start-stop state, and the amount of backup hot water usage that have been acquired. For example, at 0:00 every day, the operation data converting portion 5 calculates an average amount of main electric power, an average amount of hot water storage, an average FC start-stop state, and an average amount of backup hot water supply by averaging amounts of main electric power, amounts of hot water storage, FC start-stop states, and amounts of backup hot water usage over a specific period in the past, for example, over the last seven days, for every specific time interval, for example, for every 60 minutes, at the same time in the last seven days. The operation data converting portion 5 then converts the average amount of main electric power, the average amount of hot water storage, the average FC start-stop state, and the average amount of backup hot water supply to the average main electric power amount curve, the average hot water storage amount curve, the average FC start-stop state, and the average backup hot water supply amount curve, respectively, all of which are, for example, 24-hour-long time-series data.

Figure 6:
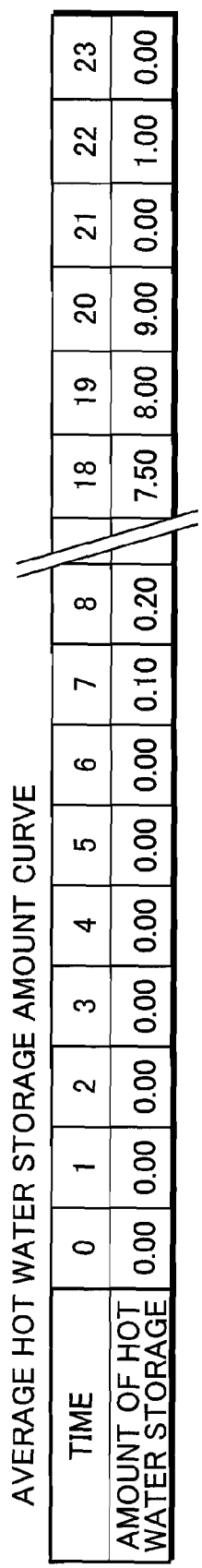
FIG. 6 is a view showing an example of an average hot water storage amount curve of the embodiment.
Figure 8:
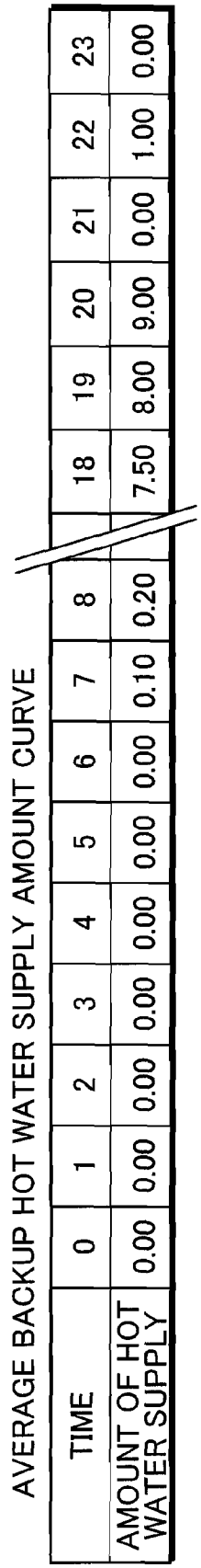
FIG. 8 is a view showing an example of an average backup hot water supply amount curve of the embodiment.

FIG. 5 is a view showing an example of the average main electric power amount curve. FIG. 6 is a view showing an example of the average hot water storage amount curve. FIG. 7 is a view showing an example of the average FC start-stop state. FIG. 8 is a view showing an example of the average backup hot water supply amount curve. In FIG. 5 through FIG. 8, for example, an amount of electric power, an amount of hot water storage, a state, and an amount of hot water supply corresponding to the time '0' respectively indicate an average amount of main electric power, an average amount of hot water storage, an average FC start-stop state, and an average amount of backup hot water supply over the time from midnight to one o'clock.

Also, the operation data converting portion 5 calculates a base main electric power amount curve by subtracting the average amounts of device electric power of devices whose shift flags are ON in the control condition information acquired from the control condition generating portion 4 from the average main electric power amount curve. The base main electric power amount curve is used to make it easier for the post-control electric power amount curve generating portion 6 to generate an electric power amount curve after the control. FIG. 9 is a view showing an example of the base main electric power amount curve.

Subsequently, in Step S6, the operation data converting portion 5 generates device operation information containing an average operation start time and an average required time by averaging operation start times and required times over a specific period in the past, for example, over the last seven days, and an average amount of device electric power and an average amount of hot water usage found by averaging amounts of device electric power and amounts of hot water supply acquired, for example, for every three seconds over a specific period in the past, for example, over the last seven days, for every specific time interval, for example, for every one minute.

FIG. 10 is a view showing an example of the device operation information. In the device operation information shown in FIG. 10, the device ID indicates an identification number allocated to each device, the device name indicates a name of each device, and the average operation start time indicates an average of operation start times of each device over the last seven days. The average required time indicates an average of times over which each device continued to operate in the past, and the average amount of device electric power and the average amount of device hot water supply indicate averages of energy each device consumed for every one minute within the required time.

The operation data converting portion 5 outputs the base main electric power amount curve and the device operation information to the post-control electric power amount curve generating portion 6. Also, the operation data converting portion 5 outputs the average main electric power amount curve, the average hot water storage amount curve, the average FC start-stop state, the average backup hot water supply amount curve, and the device operation information to the post-control hot water storage amount curve generating portion 7. Further, the operation data converting portion 5 outputs the average main electric power amount curve, the base main electric power amount curve, the average hot water storage amount curve, the average FC start-stop state, and the average backup hot water supply amount curve to the reduction amount calculating portion 9. The processing performed continuously by the post-control electric power amount curve generating portion 6, the post-control hot water storage amount curve generating portion 7, the hot water storage completion determining portion 8, the reduction amount calculating portion 9, and the running method determining potion 10, which are the following functional blocks, is repeated as many times as the number of pieces of running control information described below.

Subsequently, in Step S7, the post-control electric power amount curve generating portion 6 generates the running control information, which is a combination of the operation of start times of the devices, on the basis of the control condition information acquired from the control condition generating portion 4. The running control information is generated in order for all the combinations of the start times of the devices, but the combinations exclude the end times of the devices contained in the control condition information. FIG. 11 is a view showing an example of the running control information. As is shown in FIG. 11, the running control information is made up of the device ID, the device name, and the start time, and generated as many as all the combinations of the devices. In FIG. 11, the operation start time of the dish washer and dryer is 21:00 and the operation start time of the washing machine is 14:00.

Subsequently, in Step S8, the post-control electric power amount curve generating portion 6 generates a post-control electric power amount curve, which is a main electric power amount curve after the operation start time of the device is changed on the basis of the running control information it has generated. The post-control electric power amount curve generating portion 6 outputs the post-control electric power amount curve and the running control information it has generated to the post-control hot water storage amount curve generating portion 7. FIG. 12 is a view showing an example of the post-control electric power amount curve. The post-control electric power amount curve is generated as many as the number of pieces of the running control information.

Subsequently, in Step S9, the post-control hot water storage amount curve generating portion 7 acquires the average main electric power amount curve, the average hot water storage amount curve, and the base hot water storage amount curve from the operation data converting portion 5, and acquires the post-control electric power amount curve and the running control information from the post-control electric power amount curve generating portion 6. The post-control hot water storage amount curve generating portion 7 then generates a post-control hot water storage amount curve, which is an amount of heat, for example, for every 60-minute interval over 24 hours, found by subtracting amounts of hot water supply heat used by the devices 2 from an amount of hot water supply heat supplied from the fuel cell main body 1 in response to a change of the control method. The post-control hot water storage amount curve generating portion 7 outputs the post-control hot water storage amount curve it has generated to the hot water storage completion determining portion 8, and outputs the post-control electric power amount curve and the running control information acquired from the post-control electric power amount curve generating portion 6 to the hot water storage completion determining portion 8 without adding any change.

Figure 13:
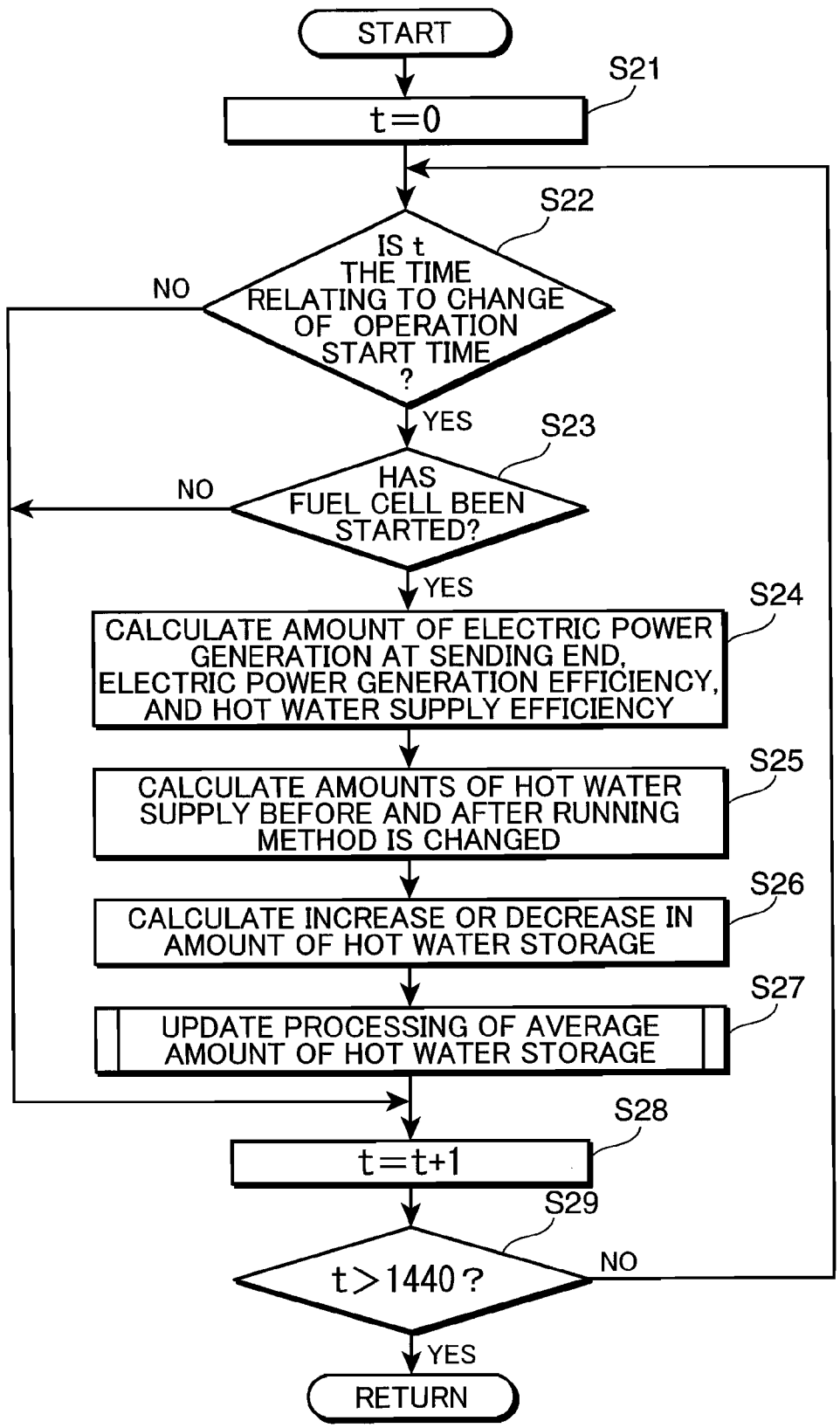
FIG. 13 is a flowchart used to describe post-control hot water storage amount curve generation processing in Step S9 in FIG. 2.

The post-control hot water storage amount curve generation processing by the post-control hot water storage amount curve generating portion 7 will now be described more in detail. FIG. 13 is a flowchart used to describe the post-control hot water storage amount curve generation processing in Step S9 in FIG. 2. The post-control hot water storage amount curve generating portion 7 repeats the processing from Step S22 to Step S27 for every specified unit time since 0:00 until an accumulated time reaches 1440 minutes.

Initially, in Step S21, the post-control hot water storage amount curve generating portion 7 initializes the time t to 0. Subsequently, in Step S22, the post-control hot water storage amount curve generating portion 7 determines whether the time t is a time relating to a change of the operation start time. When the post-control hot water storage amount curve generating portion 7 determines that the time t is the relating time (YES in Step S22), it proceeds to the processing in Step S23. Meanwhile, when the post-control hot water storage amount curve generating portion 7 determines that the time t is not the relating time (NO in Step S22), it ends the processing to check an amount of hot water storage at the time t and makes a change to check an amount of hot water storage at the next time t+1. The time relating to the operation start time means a time zone within which the device 2 is originally operating and a time zone within which the device 2 newly starts to operate because of a change of the operation start time. In a case where the time t falls within the time zone from the average operation start time for an average required time contained in the device operation information, the post-control hot water storage amount curve generating portion 7 determines that the time t is the time relating to a change of the operation start time. In other words, this determination is made because it is necessary to calculate an amount of hot water storage only at a time relating to a change of the operation start time.

Subsequently, in Step S23, the post-control hot water storage amount curve generating portion 7 determines whether the fuel cell has been started. In order to determine a start state of the fuel cell, the post-control hot water storage amount curve generating portion 7 uses the average FC start-stop state. When the average FC start-stop state indicates 0.5 or higher at the time t, the post-control hot water storage amount curve generating portion 7 determines that the fuel cell has been started. In a case where the post-control hot water storage amount curve generating portion 7 determines that the fuel cell has been started (YES in Step S23), it proceeds to the processing in Step S24. Meanwhile, when the average FC start-stop state at the time t indicates a value smaller than 0.5, the post-control hot water storage amount curve generating portion 7 determines that the fuel cell has been stopped. In a case where the post-control hot water storage amount curve generating portion 7 determines that the fuel cell has not been started (NO in Step S23), it ends the processing to check an amount of hot water storage at the time t and starts to check an amount of hot water storage at the next time t+1 as with the processing in Step S22.

Subsequently, in Step S24, the post-control hot water storage amount curve generating portion 7 finds an amount of electric power generation at sending end, electric power generation efficiency, and hot water supply efficiency on the basis of an average amount of electric power and an amount of post-control electric power. The average amount of electric power and the amount of post-control electric power are amounts of electric power at the time t in the average main electric power amount curve acquired from the operation data converting portion 5 and the post-control electric power amount curve acquired from the post-control electric power amount curve generating portion 6, respectively. The amount of electric power generation at sending end is set to 1 kWh when the average amount of electric power or the amount of post-control electric power exceeds the upper limit of electric power generation by the fuel cell (herein, 1 kW) and to 0.3 kWh when the foregoing amount is smaller than the lower limit of electric power generation (herein, 0.3 kW); otherwise, it is set to an amount of electric power equal to the average amount of electric power or the amount of post-control electric power. Because the electric power generation efficiency and the hot water supply efficiency vary with an amount of electric power generation at sending end, internally pre-stored values at some points between the upper limit to the lower limit of electric power generation by the fuel cell are used by interpolation.

In this embodiment, fixed values are used for the electric power generation efficiency and the hot water supply efficiency. However, the values may be updated periodically by acquiring an amount of electric power generation, an amount of fuel gas usage, and an amount of hot water supply on an hour-by-hour basis from the fuel cell main body 1. In this case, because sensing data of the actual equipment in the fuel cell is taken into account, it is possible to address the characteristics or performance deterioration of individual fuel cells.

Subsequently, in Step S25, the post-control hot water storage amount curve generating portion 7 calculates amounts of hot water supply before and after the operation start time is changed. Equation (1) below is used for the calculation of the amounts of hot water supply.

$$\text{amount of hot water supply} = \text{amount of electric power generation at sending end} / \text{electric power generation efficiency} \times \text{hot watery supply efficiency} \quad (1)$$

Subsequently, in Step S26, the post-control hot water storage amount curve generating portion 7 calculates an increase or decrease in amount of hot water storage between before and after the operation start time is changed. Equation (2) below is used for the calculation of an increase or decrease in amount of hot water storage. It should be noted that an increase or decrease in amount of hot water storage is 0 or smaller in some cases.

$$\text{increase or decrease in amount of hot water storage} = \text{amount of hot water supply after the operation start time is changed} - \text{amount of hot water supply before the operation start time is changed} - \text{amount of hot water used by device} \quad (2)$$

Figure 14:
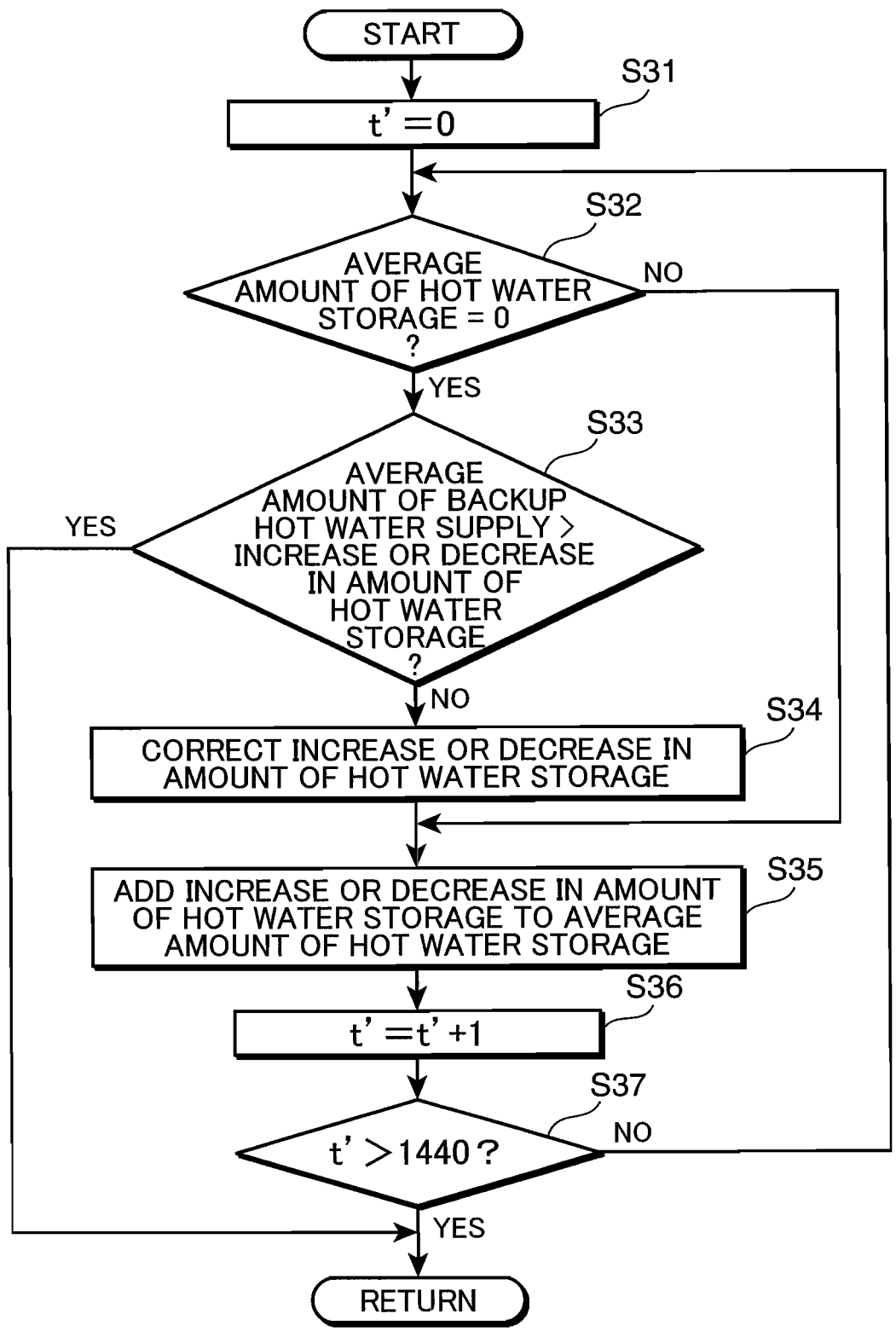
FIG. 14 is a flowchart used to describe average hot water storage amount update processing in Step S27 in FIG. 13.

Subsequently, in Step S27, the post-control hot water storage amount curve generating portion 7 performs update processing of an average amount of hot water storage at respective times. FIG. 14 is a flowchart used to describe the average hot water storage amount update processing in Step S27 in FIG. 13. Hereinafter, the average hot water storage amount update processing will be described using FIG. 14.

The average hot water storage amount update processing is performed repetitively for every specified unit time from the time t until the time t' reaches 1440 minutes. Initially, in Step S31, the post-control hot water storage amount curve generating portion 7 initializes the time t' to 0. Subsequently, in Step S32, the post-control hot water storage amount curve generating portion 7 determines whether an average amount of hot water storage is 0. The average amount of hot water storage is an average of amounts of hot water storage in the past at the time t' in the average hot water storage amount curves acquired from the operation data converting portion 5. In a case where the post-control hot water storage amount curve generating portion 7 determines that the average amount of hot water storage is not 0 (NO in Step S32), it proceeds to the processing in Step S35.

In Step S35, the post-control hot water storage amount curve generating portion 7 adds an increase or decrease in amount of hot water storage to the average amount of hot water storage. Subsequently, in Step S36, the post-control hot water storage amount curve generating portion 7 updates the time t', at which the average amount of hot water storage is updated, to t'+1. Subsequently, in Step S37, the post-control hot water storage amount curve generating portion 7 determines whether the time t' is greater than 1440 minutes. In a case where the post-control hot water storage amount curve generating portion 7 determines that the time t' is greater than 1440 minutes (YES in Step S37), it ends the average hot water storage amount update processing and proceeds to the processing in Step S28 in FIG. 13. In a case where the post-control hot water storage amount curve generating portion 7 determines that the time t' is equal to or smaller than 1440 minutes (NO in Step S37), it returns to the processing in Step S32 and repeats again the processing from Step S32 to Step S36.

Meanwhile, in a case where the post-control hot water storage amount curve generating portion 7 determines that the average amount of hot water storage is 0 in Step S32 (YES in Step S32), it has to find an average amount of hot water storage by taking into account the relation with hot water supply load that is being generated at this specific time. In this embodiment, the hot water supply load is found by replacing it with an average amount of backup hot water supply at the time t' in the average backup hot water supply amount curve acquired from the operation data converting portion 5.

Subsequently, in Step S33, the post-control hot water storage amount curve generating portion 7 determines whether the average amount of backup hot water supply is greater than an increase or decrease in amount of hot water storage. In a case where the post-control hot water storage amount curve generating portion 7 determines that the average amount of backup hot water supply is smaller than an increase or decrease in amount of hot water storage (NO in Step S33), an increase or decrease in amount of hot water storage is thought to lessen because of the hot water supply load. Hence, in Step S34, the post-control hot water storage amount curve generating portion 7 corrects an increase or decrease in amount of hot water storage. Equation (3) below is used to correct an increase or decrease in amount of hot water storage.

increase or decrease in amount of hot water storage=increase or decrease in amount of hot water storage−average amount of backup hot water supply (3)

Subsequently, in Step S35, the post-control hot water storage amount curve generating portion 7 adds the corrected increase or decrease in amount of hot water storage to the average amount of hot water storage. Subsequently, in Step S36, the post-control hot water storage amount curve generating portion 7 updates the time t', at which the average amount of hot water storage is updated, to t'+1. Subsequently, in Step S37, the post-control hot water storage amount curve generating portion 7 determines whether the time t' is greater than 1440 minutes.

Meanwhile, in a case where the post-control hot water storage amount curve generating portion 7 determines that the average amount of backup hot water supply is greater than an increase or decrease in amount of hot water storage in Step S33 (YES in Step S33), because it is thought that hot water supply load is generated to the extent of exceeding hot water supply heat accumulated within the tank, it ends the average hot water storage amount update processing while leaving the average amount of hot water storage at the time t' to 0 without adding any correction and without updating the average amount of hot water at the next and subsequent times. In this embodiment, the processing is stopped in a case where the average amount of backup hot water supply within the average amount of hot water storage is greater than an increase or decrease in amount of hot water storage in order to achieve calculation efficiency. However, the processing may be continued by substituting 0 to an increase or decrease in amount of hot water storage.

Referring to FIG. 13 again, when the update processing of an average amount of hot water storage ends in Step S27, the post-control hot water storage amount curve generating portion 7 updates the time t to the time t+1 in Step S28 in order to update an amount of hot water storage at the next time relating to a change of the running method. Subsequently, in Step S29, the post-control hot water storage amount curve generating portion 7 determines whether the time t is greater than 1440 minutes. In a case where the post-control hot water storage amount curve generating portion 7 determines that the time t is greater than 1440 minutes (YES in Step S29), it ends the update of an amount of hot water storage and proceeds to the processing in Step S10 in FIG. 2 by using a data sequence of an amount of hot water storage, for example, for every 60 minutes over 24 hours, at the ending time as the post-control hot water storage amount curve. In a case where the post-control hot water storage amount curve generating portion 7 determines that the time t is equal to or smaller than 1440 minutes (NO in Step S29), it returns to the processing in Step S22 and repeats again the processing from Step S22 to Step S28.

Referring to FIG. 2 again, in Step S10, the hot water storage completion determining portion 8 determines whether the average amounts of hot water storage at respective times in the post-control hot water storage amount curve exceed the maximum amount of hot water storage. The maximum amount of hot water storage is the maximum amount of heat that can be accumulated in the tank, and because the water temperature varies with the seasons, internally pre-stored values that vary from season to season are used. In this embodiment, fixed values are used as the maximum amount of hot water storage; however, it may be calculated from time to time by acquiring information about the water temperature or the like.

Figure 15:
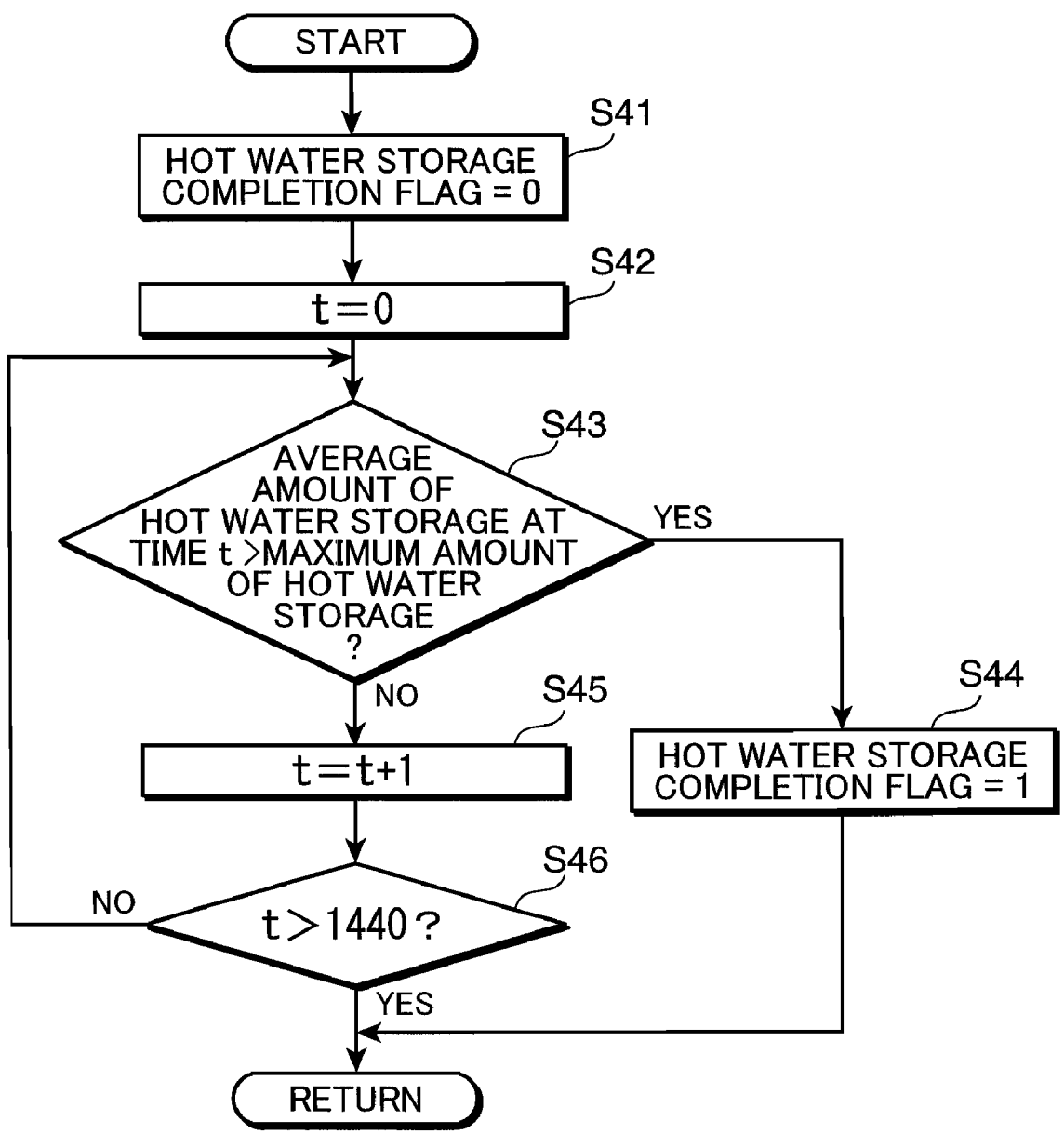
FIG. 15 is a flowchart used to describe hot water storage completion determination processing in Step S10 in FIG. 2.

FIG. 15 is a flowchart used to describe the hot water storage completion determination processing in Step S10 in FIG. 2. Initially, in Step S41, the hot water storage completion determining portion 8 substitutes 0 to a hot water storage completion flag. Then, in Step S42, the hot water storage completion determining portion 8 initializes the time t to 0, and repeats the processing from Step S43 to Step S46 for every specified unit time since 0:00 until the accumulated time reaches 1440 minutes.

Subsequently, in Step S43, the hot water storage completion determining portion 8 determines whether the average amount of hot water storage at the time t is greater than the maximum amount of hot water storage. In a case where the hot water storage completion determining portion 8 determines that the average amount of hot water storage has not exceeded the maximum amount of hot water storage in Step S43 (NO in Step S43), it updates the time t to the time t+1 in Step S45 in order to check the completion of hot water storage amount at the next time relating to a change of the operation start time.

Subsequently, in Step S46, the hot water storage completion determining portion 8 determines whether the time t exceeds 1440 minutes. In a case where the hot water storage completion determining portion 8 determines that the time t exceeds 1440 minutes (YES in Step S46), it ends the checking of the hot water storage amount completion. In a case where the hot water storage completion determining portion 8 determines that the time t has not exceeded 1440 minutes (NO in Step S46), it returns to the processing in Step S43 and repeats again the processing from Steps S43 to S46.

Meanwhile, in a case where the hot water storage completion determining portion 8 determines that the average amount of hot water storage exceeds the maximum amount of hot water storage in Step S43 (YES in Step S43), because the control method is a combination of operation start times that generates an excessive amount of hot water supply, it substitutes 1 to the hot water storage completion flag in Step S44 to stop the processing to determine the hot water storage completion. It then proceeds to the processing in Step S11 in FIG. 2.

Figure 16:
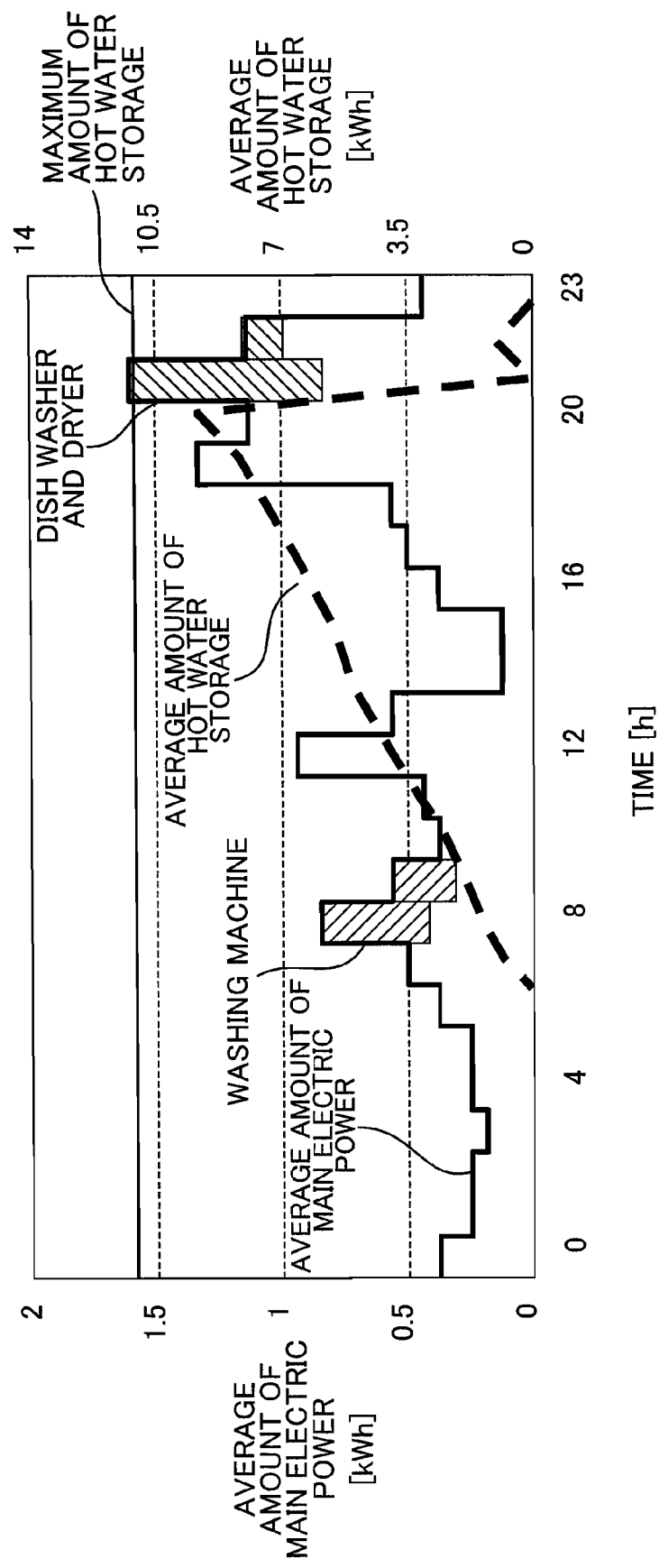
FIG. 16 is a view showing an example of the average main electric power amount curve and the average hot water storage amount curve before operation start times of devices are changed.
Figure 17:
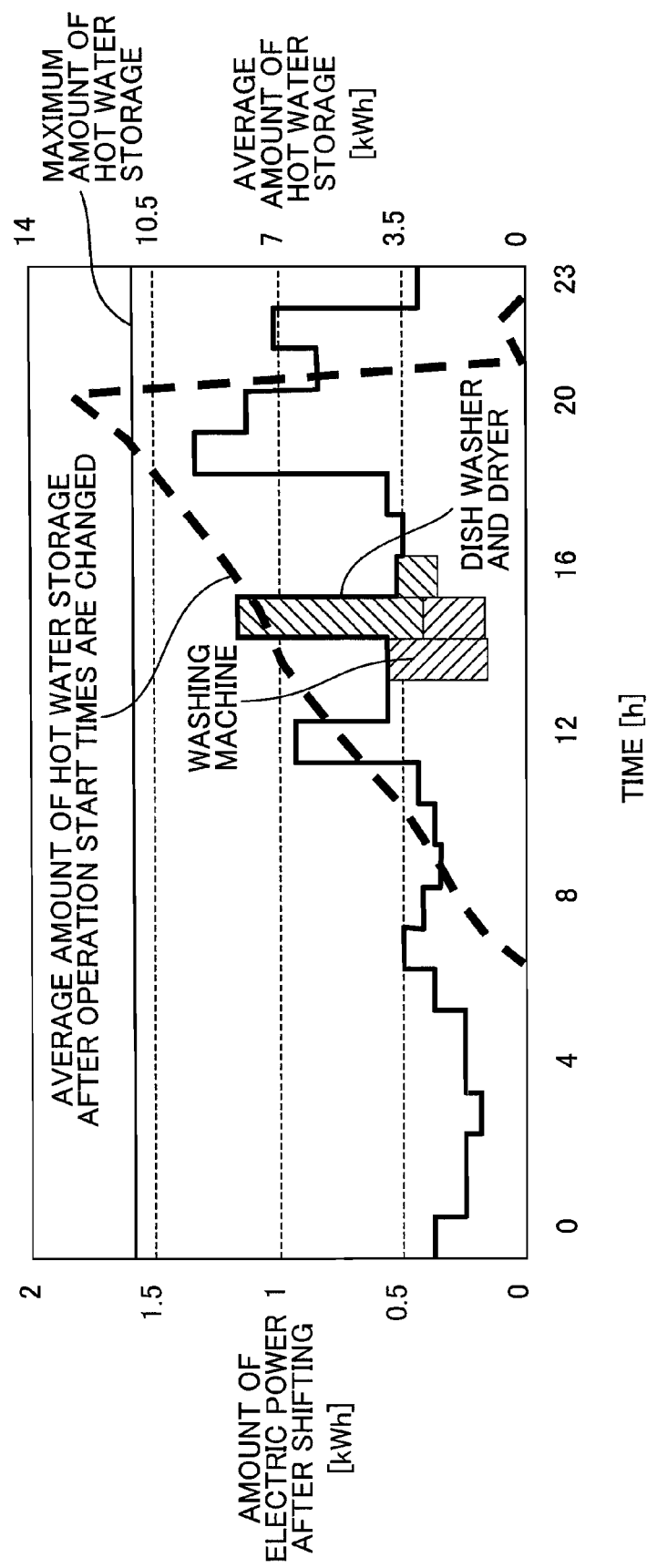
FIG. 17 is a view showing an example of the post-control electric power amount curve and a post-control hot water storage amount curve in a case where an amount of hot water storage exceeds the maximum amount of hot water storage after the operation start times of the devices are changed.
Figure 18:
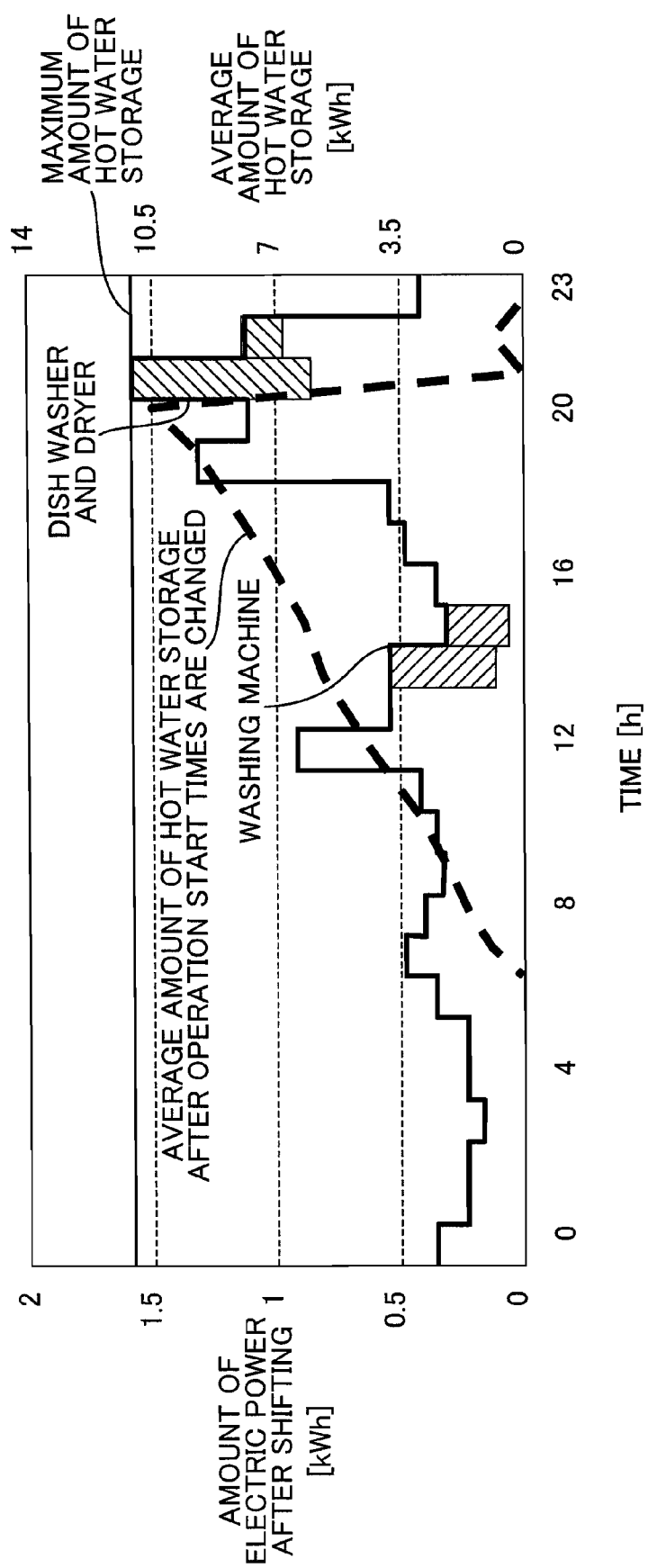
FIG. 18 is a view showing an example of the post-control electric power amount curve and the post-control hot water storage amount curve in a case where an amount of hot water storage does not exceed the maximum amount of hot water storage after the operation start times of the devices are changed.

The average main electric power amount curve and the average hot water storage amount curve will now be described. FIG. 16 is a view showing an example of the average main electric power amount curve and the average hot water storage amount curve before the operation start times of the devices are changed. FIG. 17 and FIG. 18 are views each showing an example of the post-control electric power amount curve generated by the post-control electric power amount curve generating portion 6 and the post-control hot water storage amount curve generated by the post-control hot water storage amount curve generating portion 7.

Referring to FIG. 16, the average hot water storage amount curve reaches the largest value, 9.5 kWh, at a time immediately before the hot water supply load by the dish washer and dryer is generated. Because the maximum amount of hot water storage in this instance is 11 kWh, it is understood that energy saving can be enhanced by increasing an amount of hot water supply by the fuel cell main body 1.

FIG. 17 and FIG. 18 show two examples of all the combinations of the operation start times in a case where the operation start times of the dish washer and dryer and the washing machine, whose shift flags exhibit '1' in the control condition information in FIG. 3, are changed on the basis of the main power electric amount curve and the average hot water storage amount curve in FIG. 16. In FIG. 16, the dish washer and dryer starts to operate at 21:00 and the washing machine starts to operate at 8:00. Because the fuel cell generates electric power in response to electric power load, an amount of hot water storage is increased.

In FIG. 17, the operation start time of the washing machine is changed to 14:00 and the operation start time of the dish washer and dryer is changed to 15:00. Consequently, the average amount of hot water storage at 20:00 is 12.5 kWh when the maximum amount of hot water storage is 11 kWh. Hence, because the average amount of hot water storage exceeds the maximum amount of hot water storage, the hot water storage completion determining portion 8 sets the hot water storage completion flag 1 to '1' in Step S44.

Meanwhile, in the example in FIG. 18, the washing machine starts to operate at 14:00 as with the example in FIG. 17, whereas the operation start time of the dish washer and dryer is not changed and it is the same as the time in FIG. 16. Consequently, in the example in FIG. 18, the average amount of hot water storage becomes the largest, 10.5 kWh, at 20:00. The average amount of hot water storage therefore does not exceed the maximum amount of hot water storage (11 kWh). The hot water storage amount determining portion 8 thus sets the hot water storage completion flag to '0' for the combination of changes of the operation start times in FIG. 17.

Referring to FIG. 2 again, in Step S11, the reduction amount calculating portion 9 determines whether an amount of post-control hot water storage reaches the full capacity. More specifically, the reduction amount calculating portion 9 acquires the hot water storage completion flag from the hot water storage completion determining portion 8. In a case where the hot water storage completion flag is set to '0', the reduction amount calculating portion 9 determines that an amount of post-control hot water storage does not reach the full capacity, and in a case where the hot water storage completion flag is set to '1' by the hot water storage completion determining portion 8, it determines that an amount of post-control hot water storage reaches the full capacity. In a case where the reduction amount calculating portion 9 determines that an amount of post-control hot water storage reaches the full capacity (YES in Step S11), it proceeds to the processing in Step S13.

Meanwhile, in a case where the reduction amount calculating portion 9 determines that an amount of post-control hot water storage does not reach the full capacity (NO in Step S11), it acquires, in Step S12, the reduced item data from the control condition generating portion 4, the average main electric power amount curve, the base main electric power amount curve, the average hot water storage amount curve, the average FC start-stop state, the average FC start-stop state, and the average backup hot water supply amount curve from the operation data converting portion 5, and the post-control electric power amount curve and the running control information from the hot water storage completion determining portion 8. When the hot water storage completion flag indicates that an amount of hot water storage does not exceed the tank capacity, the reduction amount calculating portion 9 calculates a reduction cost obtained by shifting the operation start times of the devices 2 in a case where the reduced item data indicates the charges, and it calculates a reduction amount of $CO_2$ emission in a case where the reduced item data indicates an amount of $CO_2$ emission.

Subsequently, in Step S13, the control method determining portion 10 determines whether a reduction amount has been calculated for all pieces of the running control information. In other words, the control method determining portion 10 determines whether a reduction amount has been calculated for all the combinations of the operation start times of devices whose operation start times are changeable. In a case where the control method determining portion 10 determines that a reduction amount has not been calculated for all pieces of the running control information (NO in Step S13), it returns to the processing in Step S8 and generates the post-control main electric power amount curve on the basis of another piece of the running control information.

Meanwhile, in a case where the control method determining portion 10 determines that a reduction amount has been calculated for all pieces of the running control information (YES in Step S13), it determines the control method of the devices 2 in Step S14 by acquiring a reduction cost or a reduction amount of $CO_2$ emission from the reduction amount calculating portion 9. More specifically, the control method determining portion 10 determines a combination of the operation start times of the devices 2 to achieve the largest reduction cost or reduction amount of $CO_2$ emission on the basis of the acquired reduction costs or reduction amounts of $CO_2$ emission. Subsequently, in Step S15, the control method determining portion 10 transmits the operation start times to the devices 2 and outputs the operation start times to the device operation monitoring portion 12.

As has been described, an amount of main electric power indicating an amount of electric power for an entire house, the fuel cell operation information indicating the operation state of the fuel cell main body 1 that supplies electric power and thermal energy, the device operation information indicating an operation state of a device consuming at least one of electric power and thermal energy, and the control condition information indicating the control condition for each device 2 are acquired. Plural pieces of running control information each specifying a changeable running method for each device 2 are generated on the basis of the control condition information, and plural post-control electric power amount curves each indicating an amount of main electric power for every specific time obtained when the running method of the device 2 is changed in response to the plural pieces of running control information on the basis of the amount of main electric power, the fuel cell operation information, and the device operation information. Subsequently, plural post-control hot water storage amount curves each indicating an accumulated amount of hot water for every specific time generated when the fuel cell generates electric power on the basis of the plural post-control electric power amount curves are generated to determine whether accumulated amounts within the plural post-control hot water storage amount curves exceed a specific heat capacity. Plural energy cost reduction amounts are then calculated, which indicate respective differences between plural energy costs, incurred in response to the plural post-control hot water storage amount curves determined as not exceeding the specific heat capacity and the plural post-control electric power amount curves corresponding to the plural post-control hot water storage amount curves, and the energy cost incurred in response to an amount of main electric power before the running method of the device 2 is changed. The running control information corresponding to the largest energy cost reduction amount, which is the largest among plural energy cost reduction amounts, is determined as the running method of the device 2.

Because an amount of hot water storage that varies with a change of the running method is calculated by taking into account hot water supply heat used by the device 2 and the running method of the device 2 by which an amount of post-control hot water storage does not exceed the specific heat capacity is determined, hot water will not be stored in an excessive amount. It is thus possible to prevent an event that heat is released or the fuel cell is stopped, which can in turn enhance energy saving and economical efficiency.

The calculation of the operation start times of the devices triggered by the operation data converting portion 5 is made once a day on the basis of the control condition information, and the same is performed on the basis of the released control condition information. It should be noted that in the case of the calculation of the operation start times on the basis of the released control condition information, the control method determining portion 10 neither transmits nor outputs the operation start times to the devices 2 and the device operation monitoring portion 12.

The per-device reduction amount calculating portion 11 acquires the operation start times of the devices 2 and the post-control main electric power amount curve on the basis of the control condition information and the released control condition information from the control method determining portion 10, and acquires the device operation information and the average main electric power amount curve from the operation data converting portion 5. The per-device reduction amount calculating portion 11 calculates charges or an amount of $CO_2$ emission reduced by changing the operation start time of the device 2 for each device.

A method of calculating the charges will now be described. Initially, the per-device reduction amount calculating portion 11 calculates an amount of electric power generation and the charges incurred for every unit time, and calculates the charges incurred for each device 2 from the proportion of the electric power charges of each device 2 in the charges for every unit time. The per-device reduction amount calculating portion 11 then accumulates the charges, for example, for 24 hours, and calculates a reduction amount by comparing the charges before the operation start time is changed with the charges after the operation start time is changed. The charges of each device 2 are found on the basis of the device operation information and the average main electric power amount curve before the operation start time is changed, and after the operation start time is changed, the charges of each device 2 are generated on the basis of shift time information and the post-control main electric power amount curve. The per-device reduction amount calculating portion 11 outputs the shift time information and a reduction amount for each device on the basis of the control condition information and the shift time information and a reduction amount for each device on the basis of the released control condition information to the display operation portion 13.

Figure 19:
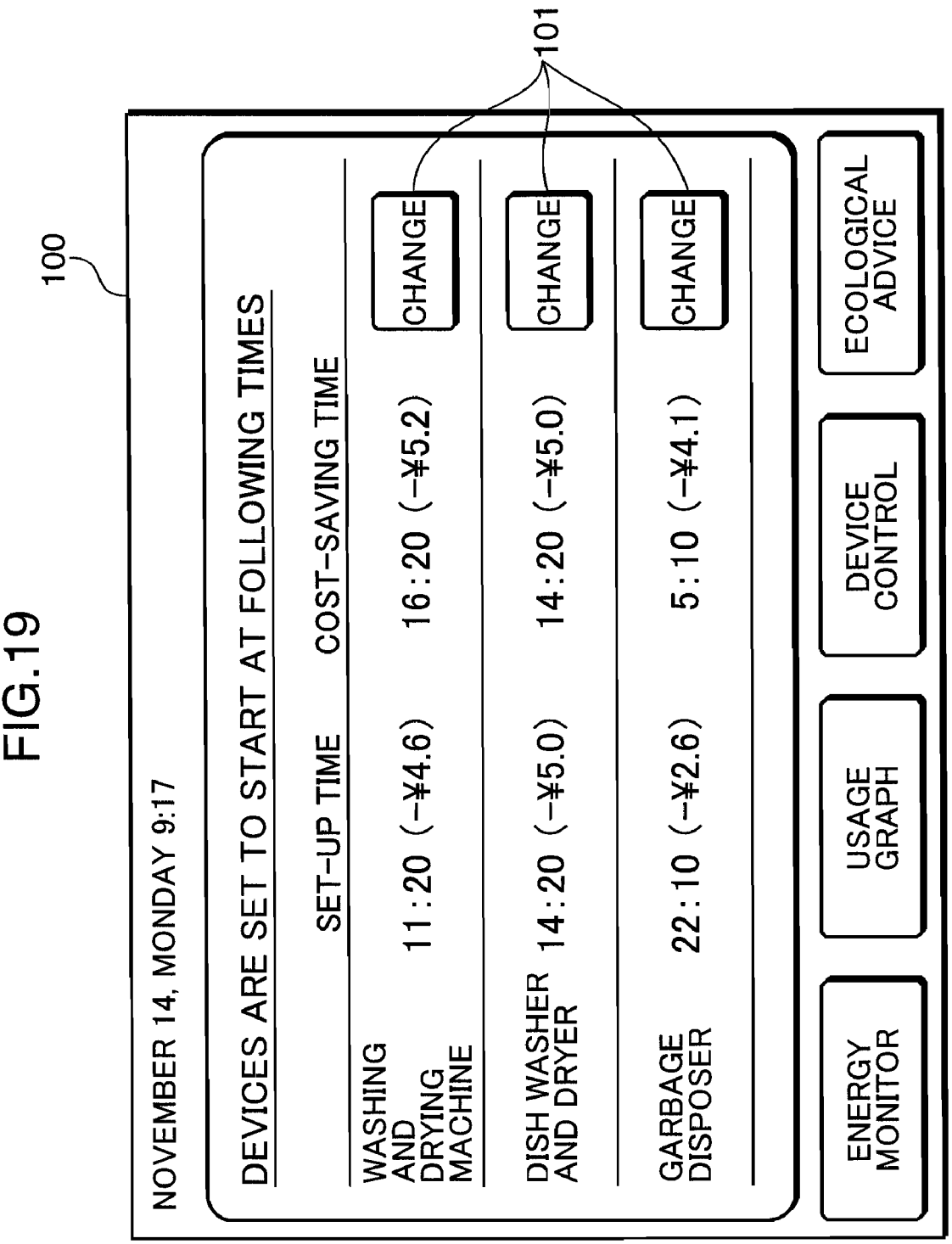
FIG. 19 is a view showing an example of a set-up time display screen displayed on a display operation portion of the embodiment.
Figure 21:
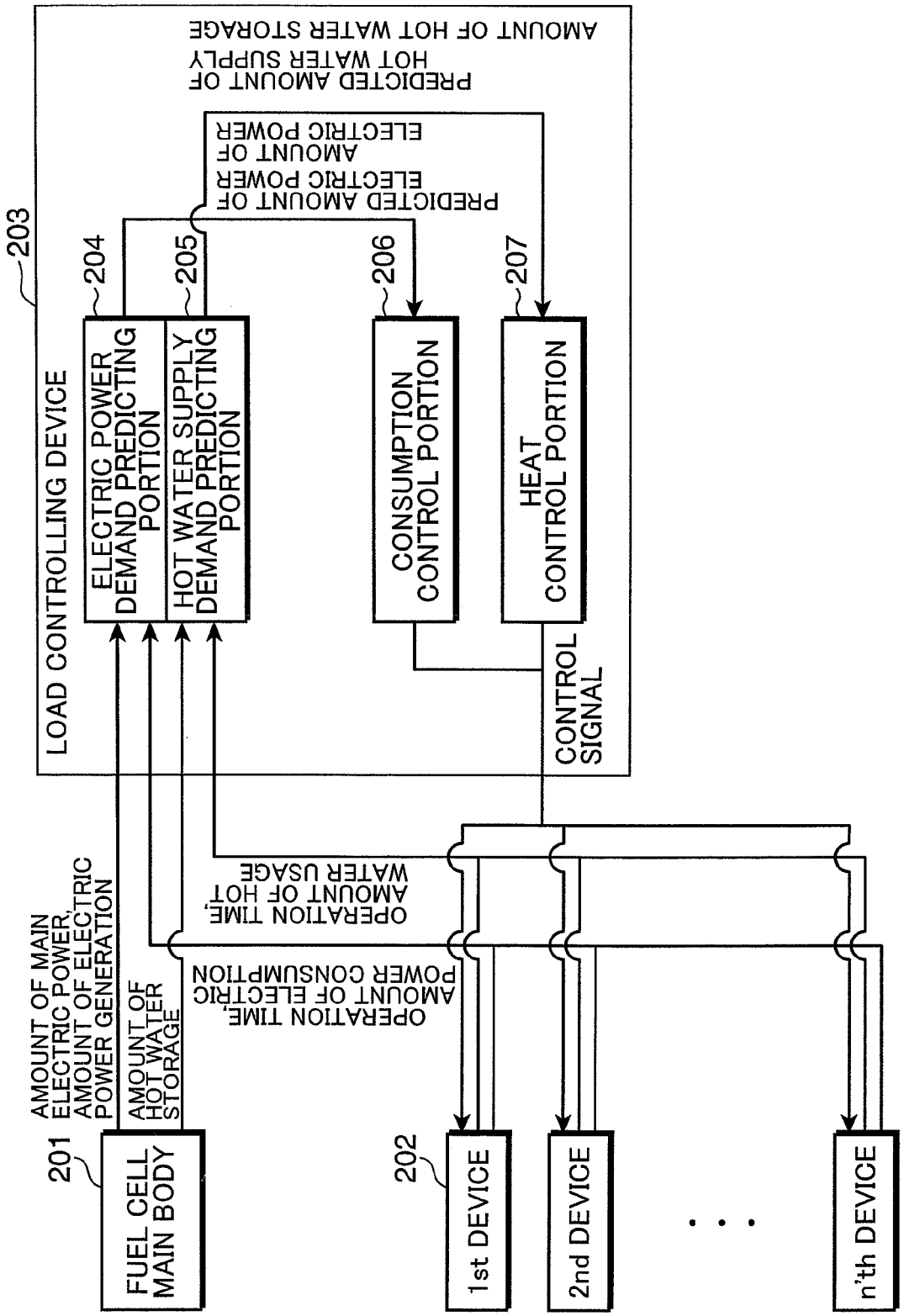
FIG. 21 is a block diagram showing the configuration of a conventional load controlling device.

The display operation portion 13 acquires the shift time information and a reduction amount for each device from the per-device reduction amount calculating portion 11 and displays them on the screen. FIG. 19 is a view showing an example of a set-up time display screen displayed on the display operation portion. A set-up time display screen 100 shown in FIG. 19 is formed of the operation start time and a reduction cost of each device 2 generated on the basis of the control condition information and the operation start time and a reduction cost of each device 2 generated on the basis of the released control condition information. 'Set-up time' shown in FIG. 19 indicates the operation start time of each device 2 generated on the basis of the control condition information, and 'cost-saving time' indicates the operation start time of each device 2 generated on the basis of the released control condition information.

On the set-up time display screen 100 in FIG. 19, the operation start time of the washing and drying machine is set to 11:20 and information indicating that a reduction by ¥4.6 is possible is displayed. Also, the operation start time of the dish washer and dryer is set to 14:20 and information indicating that a reduction of ¥5.0 is possible is displayed thereon. Further, the operation start time of the garbage disposer is set to 22:10 and information indicating that a reduction of ¥2.6 is possible is displayed thereon.

Also, another information is displayed, indicating that in a case where a range from the operation start time to the operation end time is changed by adopting the restriction releasing condition information contained in the released control condition information as follows: the operation start time of the washing and drying machine is set to 16:20, the operation start time of the dish washer and dryer is set to 14:20, and the operation start time of the garbage disposer is set to 5:10, then, the cost of the washing and drying machine can be saved by ¥5.2 and the cost of the garbage disposer can be saved by ¥4.1.

According to the configuration as above, the running control method of the device 2 is calculated by calculating an amount of hot water storage that varies with a change of the running method by the post-control hot water storage amount curve generating portion 7 while taking hot water supply heat used by the device 2 into account, and by determining whether the hot water supply heat exceeds an amount of hot water storage within the tank by the hot water storage completion determining portion 8, hot water will not be stored in an excessive amount. It is thus possible to avoid an event that heat is released or the fuel cell is stopped, which can in turn enhance energy saving and economy efficiency.

The above has described the calculation of the operation start times of the devices 2 performed at a specific time, for example, once in a day. The calculation of the operation start times of the devices 2 in a case where the user changes the operation start time zones of the devices 2 using the display operation portion 13 will now be described. For example, as is shown in FIG. 18, the display operation portion 13 displays the shift time information for each device on the basis of the control condition information and a reduction amount in such a case, the shift time information for each device on the basis of the released control condition information and a reduction amount in such a case, and change buttons 101 allocated to respective devices.

The display operation portion 13 displays a time change screen when the user depresses any of the change buttons 101 allocated to respective devices. FIG. 20 is a view showing an example of the time change screen displayed on the display operation portion. The time change screen shown in FIG. 20 shows the operation start time zone that is currently set and the operation start time zone on the basis of the restriction releasing condition information. 'Set-up time" shown in FIG. 20 indicates the operation start time zone currently set and 'new set-up time' indicates the operation start time zone released on the basis of the restriction releasing condition information.

As the user depresses a set button 111 shown in FIG. 20, the display operation portion 13 outputs the released control condition information to the control condition changing portion 14 as the control condition information. The control condition changing portion 14 then changes the control condition in the control condition database 15, and outputs a trigger for recalculation to the operation data converting portion 5. Upon receipt of the trigger for recalculation outputted from the control condition changing portion 14, the operation data converting portion 5 performs again a series of processing steps from the control condition generating portion 4 to the display operation portion 13 as described above.

By the processing described above, the user becomes able to change the operation start time zone after he confirms the advantage obtained by extending the operation start time zone of the device 2. Moreover, when the user changes the operation start time zone, it is possible to further reduce the charges or an amount of $CO_2$ emission, which cannot be achieved unless the operation start time zone is changed.

Finally, another trigger for calculation of the operation start times of the devices 2 will be described. The operation data converting portion 5 outputs the device operation information to the device operation monitoring portion 12 at a specific time, for example, once a day. The device operation monitoring portion 12 acquires the device operation information, which can be said as normal operation information of the devices 2, from the operation data converting portion 5, acquires the operation time, an amount of device electric power, and an amount of hot water usage from each device 2 for every specific time interval, for example, for every three seconds, and acquires the operation times of the devices 2 from the control method determining portion 10. The device operation monitoring device 12 compares the operation time, an amount of device electric power, and an amount of hot water usage acquired from each device 2 with the device operation information acquired from the operation data converting portion 5. In a case where the operation start times of the devices 2 are different from the device operation information, the device operation monitoring portion 12 outputs a trigger for recalculation to the operation data converting portion 5. Upon receipt of a trigger for recalculation outputted from the device operation monitoring device 12, the operation data converting device 5 performs again a series of processing steps from the control condition generating portion 4 to the display operation portion 13 as described above.

The device operation monitoring portion 12 outputs a trigger for recalculation to the operation data converting portion 5 also in a case where it acquires the starting of operations by the devices 2 at times different from the operation start times of the devices 2 acquired from the control method determining portion 10. According to this processing, even when the devices 2 are started to operate at times other than the intended times, it is always possible to set the operation times of the devices 2 to times at which the charges or an amount of $CO_2$ emission is reduced to the minimum.

Further, in this embodiment, the setting may be made in advance by dividing devices consuming at least one of electric power and thermal energy to devices subjected to running control that are subjected to running control by the load controlling device and devices not subjected to the running control that are not subjected to the running control. For example, the devices subjected to the running control are a dish washer and dryer and a washing machine, and the devices not subjected to the running control are devices, such as an air conditioner, that consume a relatively large amount of electric power and the running method thereof changes frequently depending on the user's preference. The device operation monitoring portion 12 acquires the device operation information of the devices not subjected to the running control for specific time interval, and in a case where the acquired device operation information is different from the operation device information acquired last time, it outputs a trigger for recalculation to the operation data converting portion 5.

For example, in a case where the running method regarding the set temperature or an amount of air flow of an air conditioner, which is a device not subjected to the running control, is changed by the user, an amount of electric power consumed by the air conditioner is increased, and so is an amount of main electric power, which is an amount of electric power for an entire house. The device operation monitoring device 12 thus monitors the running method of the air conditioner, which is a device not subject to the running control, and determines the running methods of the devices subjected to the running control using a change of the running method of the air conditioner as a trigger. In this manner, in a case where there is a change in the running method of the device not subjected to the running control that gives an influence to electric power consumption and thermal energy consumption within the house, a new running method is determined by generating again the running control information by taking the running method of the device not subjected to the running control into account. It is therefore possible to control the devices always by the running methods capable of reducing the energy cost to the minimum.

In this embodiment, an amount of hot water storage is changed and completion of hot water storage is determined using the average main electric power amount curve, the average hot water storage amount curve, and the average backup hot water supply amount curve found by averaging the operation history in the past. However, an amount of hot water storage may be changed and completion of hot water storage may be determined using a result when the control of the fuel cell is simulated using electric power load and hot water supply load predicted by various methods.

In this embodiment, the devices 2 are controlled as to the operation start times alone. However, the running states may be controlled so that electric power consumption is increased or decreased.

The specific embodiment described above chiefly includes inventions having the following configurations.

A load controlling device according to an aspect of the invention includes: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A load controlling method according to another aspect of the invention includes: an information acquiring step of acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating step of generating plural pieces of running control information each indicating a changeable running method for each device on the basis of the control condition information acquired in the information acquiring step, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired in the information acquiring step; a post-control hot water storage amount data generating step of generating plural items of post-control hot water storage amount data each indicating an accumulated amount of hot water for every specific time generated in a case where a fuel cell generates electric power on the basis of the plural items of post-control electric power amount data generated in the post-control electric power amount data generating step; a hot water storage amount determining step of determining whether the accumulated amounts within the plural items of post-control hot water storage amount data generated in the post-control hot water storage amount data generating step exceed a specific heat capacity; a reduction amount calculating step of calculating plural energy cost reduction amounts indicating respective differences between plural energy costs, incurred in response to the plural items of post-control hot water storage amount data determined as not exceeding the specific heat capacity in the hot water storage amount determining step and the plural items of post-control electric power amount data corresponding to the plural items of post-control hot water storage amount data, and an energy cost incurred in response to the amount of main electric power before the running method of the device is changed; and a running method determining step of determining, as the running method of the device, the running control information corresponding to a largest energy cost reduction amount, which is largest among the plural energy cost reduction amounts calculated in the reduction amount calculating step.

A load controlling program according to still another aspect of the invention causes a computer to function as: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding to the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A computer-readable recording medium where a load controlling program is recorded according to still another aspect of the invention has recorded therein a load controlling program that causes a computer to function as: an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device; a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion; a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion; a hot water storage amount determining portion for determining whether the accumulated amounts within the plural items of post-control hot water storage amount data generated by the post-control hot water storage amount data generating portion exceed a specific heat capacity; a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding to the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

A load controlling circuit according to still another aspect of the invention includes: a post-control electric power amount data generating circuit for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device, generating plural pieces of running control information each indicating a changeable running method for each device on the basis of the control condition information that has been acquired, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information that have been acquired; a post-control hot water storage amount data generating circuit for generating plural items of post-control hot water storage amount data each indicating an accumulated amount of hot water for every specific time generated in a case where a fuel cell generates electric power on the basis of the plural items of post-control electric power amount data generated by the post-control electric power amount data generating circuit; a hot water storage amount determining circuit for determining whether the accumulated amounts within the plural items of post-control hot water storage amount data generated by the post-control hot water storage amount data generating circuit exceed a specific heat capacity; a reduction amount calculating circuit for calculating plural energy cost reduction amounts indicating respective differences between plural energy costs, incurred in response to the plural items of post-control hot water storage amount data determined as not exceeding the specific heat capacity by the hot water storage amount determining circuit and the plural items of post-control electric power amount data corresponding to the plural items of post-control hot water storage amount data, and an energy cost incurred in response to the amount of main electric power before the running method of the device is changed; and a running method determining circuit for determining, as the running method of the device, the running control information corresponding to a largest energy cost reduction amount, which is largest among the plural energy cost reduction amounts calculated by the reduction amount calculating circuit.

According to these configurations, an amount of main electric power indicating an amount of electric power for an entire entity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device are acquired. Subsequently, plural pieces of running control information each indicating a changeable running method for each device are generated on the basis of the control condition information, and plural items of post-control electric power amount data, each indicating the amount of main electric power for every specific time obtained in a case where the running method of the device is changed in response to the plural pieces of running control information, are generated on the basis of the amount of main electric power, the fuel cell operation information, and the device operation information. Subsequently, plural items of post-control hot water storage amount data, each indicating an accumulated amount of hot water for every specific time generated in a case where the fuel cell generates electric power, are generated on the basis of the plural items of post-control electric power amount data, and whether the accumulated amounts within the plural items of post-control hot water storage amount data exceed a specific heat capacity is determined. Plural energy cost reduction amounts are then calculated, which indicate respective differences between plural energy costs, incurred in response to the plural items of post-control hot water storage amount data determined as not exceeding the specific heat capacity and the plural items of post-control electric power amount data corresponding to the plural items of post-control hot water storage amount data, and an energy cost incurred in response to the amount of main electric power before the running method of the device is changed. The running control information corresponding to the largest energy cost reduction amount, which is the largest among the plural energy cost reduction amounts, is determined as the running method of the device.

Because an amount of hot water storage that varies with a change of the running method is calculated by taking into account hot water supply heat used by the device and the running method of the device by which an amount of post-control hot water storage does not exceed the specific heat capacity is determined, hot water will not be stored in an excessive amount. It is thus possible to prevent an event that heat is released or the fuel cell is stopped, which can enhance energy saving and economical efficiency.

Also, in the load controlling device described above, it is preferable that the fuel cell operation information includes an amount of hot water storage indicating an accumulated amount of hot water, start and stop states of the fuel cell, and an amount of hot water usage from a water heater attached to the fuel cell. According to this configuration, the fuel cell operation information includes an amount of hot water storage indicating an accumulated amount of hot water, the start and stop states of the fuel cell, and an amount of hot water usage from the water heater attached to the fuel cell, and it is possible to generate the post-control electric power amount data and the post-control hot water storage amount data after the running method of the device is changed using the foregoing information.

Also, in the load controlling device described above, it is preferable that the post-control hot water storage amount data generating portion calculates, on the basis of the post-control electric power data, an increase or decrease in amount of hot water storage indicating an amount of thermal energy that increases or decreases with a change of the running method of the device for each of the plural pieces of running control information, and adds the increase or decrease in amount of hot water storage to the amount of hot water storage before the running method is changed by setting the increase or decrease in amount of hot water storage to 0 in a case where the amount of hot water usage is equal to or greater than 0 and greater than the increase or decrease in amount of hot water storage, and by using a value found by subtracting the amount of hot water usage from the increase or decrease in amount of hot water storage as a new increase or decrease in amount of hot water storage in a case where the amount of hot water usage is equal to or greater than 0 and smaller than the increase or decrease in amount of hot water storage.

According to this configuration, an increase or decrease in amount of hot water storage indicating an amount of thermal energy that increases or decreases with a change of the running method of the device is calculated on the basis of the post-control electric power data for each of the plural pieces of running control information. The increase or decrease in amount of hot water storage is added to the amount of hot water storage before the running method is changed by setting the increase or decrease in amount of hot water storage to 0 in a case where the amount of hot water usage is equal to or greater than 0 and greater than the increase or decrease in amount of hot water storage, and by using a value found by subtracting the amount of hot water usage from the increase or decrease in amount of hot water storage as a new increase or decrease in amount of hot water storage in a case where the amount of hot water usage is equal to or greater than 0 and smaller than the increase or decrease in amount of hot water storage.

Hence, an increase or decrease in amount of hot water storage that increases or decreases with a change of the running method of the device is calculated on the basis of the post-control electric power data, and the increase or decrease in amount of hot water storage is corrected in response to an amount of hot water usage, so that an amount of hot water is updated by adding the corrected increase or decrease in amount of hot water storage to an amount of hot water storage before the running method is changed, thereby generating the post-control hot water storage amount data.

Also, in the load controlling device described above, it is preferable that the hot water storage amount data generating portion generates, as the plural items of post-control hot water storage amount data, an accumulated amount for every specific time, which is a sum of an amount of thermal energy generated in a case where the fuel cell generates electric power on the basis of the plural items of post-control electric power amount data and an amount of thermal energy consumed by the device.

According to this configuration, an accumulated amount for every specific time, which is a sum of an amount of thermal energy generated in a case where the fuel cell generates electric power on the basis of the plural items of post-control electric power amount data and an amount of thermal energy consumed by the device, is generated as the plural items of post-control hot water storage amount data. It is therefore possible to generate the post-control hot water storage amount data by accumulating a sum of an amount of thermal energy generated in a case where the fuel cell generates electric power on the basis of the plural items of post-control electric power amount data and an amount of thermal energy consumed by the device for every specific time.

Also, in the load controlling device described above, it is preferable that the hot water storage amount determining portion determines whether the accumulated amounts within the plural items of post-control hot water storage amount data generated by the post-control hot water storage amount data generating portion exceed a maximum capacity of a tank of a water heater attached to the fuel cell.

According to this configuration, whether the accumulated amounts within the plural items of post-control hot water storage data exceed the maximum capacity of the tank of the water heater attached to the fuel cell is determined. Normally, when an amount of hot water storage exceeds the maximum capacity of the tank, it becomes necessary to release thermal energy or the fuel cell is stopped until the tank becomes available owing to hot water supply load. However, by determining whether an accumulated amount within the post-control hot water storage amount data exceeds the maximum capacity of the tank and by determining the running method of the device on the basis of the post-control hot water storage amount data with which the accumulated amount does not exceed the maximum capacity of the tank, it is possible to control the fuel cell without stopping the fuel cell, which can enhance energy saving.

Also, in the load controlling device described above, it is preferable that the energy cost is at least one of a charge cost and an amount of $CO_2$ emission. According to this configuration, because a reduction amount is calculated for at least one of the charge cost and an amount of $CO_2$ emission, it is possible to control the device by the running method achieving a reduction of the charge cost or the running method achieving a reduction in amount of $CO_2$ emission.

Also, in the load controlling device described above, it is preferable to further include: a control condition memory portion for storing the control condition information to impose restriction on at least one of a running time, a running mode, an amount of electric power consumption, and an amount of hot water supply heat consumption for each device; a control condition input accepting portion for accepting an input of the control condition information by a user;

and a control condition changing portion for changing the control condition information stored in the control condition memory portion to the control condition information accepted by the control condition input accepting portion.

According to this configuration, the control condition information to impose restriction on at least one of a running time, a running mode, an amount of electric power consumption, and an amount of hot water supply heat consumption is stored in the control condition memory portion for each device. An input of the control condition information by the user is accepted, and the control condition information stored in the control condition memory portion is changed to the control condition information inputted by the user. The user is thus able to change the control condition information, and the running control information can be generated on the basis of the control condition information changed by the user.

Also, in the load controlling device described above, it is preferable to further include a restriction releasing input accepting portion for accepting an input by the user of restriction releasing information to release the restriction imposed on at least one of the running time, the running mode, the amount of electric power consumption, and the amount of hot water supply heat consumption for each device, and it is preferable that the control condition changing portion changes the control condition information stored in the control condition memory portion in response to the restriction releasing information accepted by the restriction releasing input accepting portion.

According to this configuration, an input by the user of restriction releasing information to release the restriction imposed on at least one of the running time, the running mode, the amount of electric power consumption, and the amount of hot water supply heat consumption for each device is accepted, and the control condition information stored in the control condition memory portion is changed in response to the restriction releasing information inputted by the user. Hence, by releasing the restriction imposed on at least one of the running time, the running mode, the amount of electric power consumption, and the amount of hot water supply heat consumption, it is possible to determine the running method of the device that achieves a reduction of the energy cost in comparison with the control condition information inputted by the user.

Also, in the load controlling device described above, it is preferable to further include a per-device reduction amount calculating portion for calculating energy cost reduction amounts before and after the running methods of the plural devices are changed on the basis of the running control information corresponding to the largest energy cost reduction amount for each device.

According to this configuration, energy cost reduction amounts for each device before and after changing the running methods of the plural devices are calculated on the basis of the running control information corresponding to the largest energy cost reduction amount. It is thus possible to calculate how much the energy cost can be reduced for each device before and after the running method is changed.

Also, in the load controlling device described above, it is preferable to further include a restriction releasing input accepting portion for accepting an input by a user of restriction releasing information to release the restriction imposed on at least one of the running time, the running mode, the amount of electric power consumption, and the amount of hot water supply heat consumption for each device, and it is preferable that the control condition changing portion changes the control condition information stored in the control condition memory portion in response to the restriction releasing information accepted by the restriction releasing input accepting portion and that the load controlling device further includes a display portion for displaying the running control information of the device corresponding to the largest energy cost reduction amount and the energy cost reduction amount for each device, and the running control information of the device corresponding to a largest energy cost reduction amount and an energy cost reduction amount for each device obtained by the restriction releasing information.

According to this configuration, an input by the user of restriction releasing information to release the restriction imposed on at least one of the running time, the running mode, the amount of electric power consumption, and the amount of hot water supply heat consumption for each device is accepted, and the control condition information stored in the control condition memory portion is changed in response to the restriction releasing information inputted by the user. In addition, the running control information of the device corresponding to the largest energy cost reduction amount and the energy cost reduction amount for each device are displayed, and further, the running control information of the device corresponding to a largest energy cost reduction amount and an energy cost reduction amount for each device obtained by the restriction releasing information are displayed. Hence, by releasing the restriction imposed by the control condition information using the restriction releasing condition, it is possible to present to the user how much the energy cost can be reduced in comparison with the energy cost before the restriction is released.

Also, in the load controlling device described above, it is preferable to further include a device operation monitoring portion for monitoring the running method of the device, and in a case where the device is operated by a running method different from the running method determined by the running method determining portion, providing an instruction to the post-control electric power amount data generating portion to generate the running control information again.

According to this configuration, the running method of the device is monitored, and in a case where the device is operated by a running method different from the running method determined by the running method determining portion, an instruction is provided to the post-control electric power amount data generating portion to generate the running control information again. Hence, in a case where the device is operated by a running method different from the running method determined by the running method determining portion, a new running method is determined by generating the running control information again by taking this different running method into account. It is therefore possible to always control the device by the running method by which the energy cost can be reduced to the minimum.

Also, in the load controlling device described above, it is preferable that the device includes a device subjected to control that is subjected to running control by the load controlling device and a device not subjected to the running control that is not subjected to the running control, and that in a case where the running method of the device not subjected to the running control is changed, the device operation monitoring portion provides an instruction to the post-control electric power amount data generating portion to generate the running control information again.

According to this configuration, the device includes a device subjected to control that is subjected to running control by the load controlling device and a device not subjected to the running control that is not subjected to the running control, and in a case where the running method of the device not subjected to the running control is changed, an instruction is provided to the post-control electric power amount data generating portion to generate the running control information again. Hence, in a case where there is a change in the running method of the device not subjected to the running control that gives an influence to electric power consumption and thermal energy consumption of the entity using electric power, a new running method is determined by generating the running control information again by taking the running method of this device not subjected to the running control into account. It is therefore possible to always control the device by the running method by which the energy cost can be reduced to the minimum.

INDUSTRIAL APPLICABILITY

The load controlling device, the load controlling method, the load controlling circuit, the load controlling program, and a computer-readable recording medium where the load controlling program is recorded of the invention are useful for a fuel cell system that controls electric power consuming devices by taking into account power electric load, hot water supply load, and an accumulated amount of thermal energy generated from the fuel cell. They are also applicable to a co-generation device or the like that is equipped with an electric generator using a driving motor, such as a gas engine and a gas turbine, as the driving source and generates electric power and thermal energy.

The invention claimed is:

1. A load controlling device comprising:
a processor and storage device, said load controlling device further comprising:
an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device;
a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion;
a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion;
a hot water storage amount determining portion for determining whether the accumulated amounts within the plural items of post-control hot water storage amount data generated by the post-control hot water storage amount data generating portion exceed a specific heat capacity;
a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding the plural items of post-control hot water storage amount data, and an energy cost incurred in response to the amount of main electric power before the running method of the device is changed; and
a running method determining portion for determining, as the running method of the device, the running control information corresponding to a largest energy cost reduction amount, which is largest among the plural energy cost reduction amounts calculated by the reduction amount calculating portion.

2. The load controlling device according to claim 1, wherein:
the fuel cell operation information includes an amount of hot water storage indicating an accumulated amount of hot water, start and stop states of the fuel cell, and an amount of hot water usage from a water heater attached to the fuel cell.

3. The load controlling device according to claim 2, wherein:
the post-control hot water storage amount data generating portion calculates, on the basis of the post-control electric power amount data, an increase or decrease in amount of hot water storage indicating an amount of thermal energy that increases or decreases with a change of the running method of the device for each of the plural pieces of running control information, and adds the increase or decrease in amount of hot water storage to the amount of hot water storage before the running method is changed by setting the increase or decrease in amount of hot water storage to 0 in a case where the amount of hot water usage is equal to or greater than 0 and greater than the increase or decrease in amount of hot water storage, and by using a value found by subtracting the amount of hot water usage from the increase or decrease in amount of hot water storage as a new increase or decrease in amount of hot water storage in a case where the amount of hot water usage is equal to or greater than 0 and smaller than the increase or decrease in amount of hot water storage.

4. The load controlling device according to claim 1, wherein:
the post-control hot water storage amount data generating portion generates, as the plural items of post-control hot water storage amount data, an accumulated amount for every specific time, which is a sum of an amount of thermal energy generated in a case where the fuel cell generates electric power on the basis of the plural items of post-control electric power amount data and an amount of thermal energy consumed by the device.

5. The load controlling device according to claim 1, wherein:
the hot water storage amount determining portion determines whether the accumulated amounts within the plural items of post-control hot water storage amount data generated by the post-control hot water storage amount data generating portion exceed a maximum capacity of a tank of a water heater attached to the fuel cell.

6. The load controlling device according to claim 1, wherein:
the energy cost is at least one of a charge cost and an amount of $CO_2$ emission.

7. The load controlling device according to claim 1, further comprising:
a control condition memory portion for storing the control condition information to impose restriction on at least one of a running time, a running mode, an amount of electric power consumption, and an amount of hot water supply heat consumption for each device;
a control condition input accepting portion for accepting an input of the control condition information by a user; and
a control condition changing portion for changing the control condition information stored in the control condition memory portion to the control condition information accepted by the control condition input accepting portion.

8. The load controlling device according to claim 7, further comprising:
a restriction releasing input accepting portion for accepting an input by the user of restriction releasing information to release the restriction imposed on at least one of the running time, the running mode, the amount of electric power consumption, and the amount of hot water supply heat consumption for each device,
wherein the control condition changing portion changes the control condition information stored in the control condition memory portion in response to the restriction releasing information accepted by the restriction releasing input accepting portion.

9. The load controlling device according to claim 8, further comprising:
a per-device reduction amount calculating portion for calculating energy cost reduction amounts before and after the running methods of plural devices are changed on the basis of the running control information corresponding to the largest energy cost reduction amount for each device.

10. The load controlling device according to claim 9, further comprising:
a restriction releasing input accepting portion for accepting an input by a user of restriction releasing information to release the restriction imposed on at least one of the running time, the running mode, the amount of electric power consumption, and the amount of hot water supply heat consumption for each device,
wherein:
the control condition changing portion changes the control condition information stored in the control condition memory portion in response to the restriction releasing information accepted by the restriction releasing input accepting portion; and
the load controlling device further comprises a display portion for displaying the running control information of the device corresponding to the largest energy cost reduction amount and the energy cost reduction amount for each device, and the running control information of the device corresponding to a largest energy cost reduction amount and an energy cost reduction amount for each device obtained by the restriction releasing information.

11. The load controlling device according to claim 1, further comprising:
a device operation monitoring portion for monitoring the running method of the device, and in a case where the device is operated by a running method different from the running method determined by the running method determining portion, providing an instruction to the post-control electric power amount data generating portion to generate the running control information again.

12. The load controlling device according to claim 11, wherein:
the device includes a device subjected to control that is subjected to running control by the load controlling device and a device not subjected to the running control that is not subjected to the running control; and
in a case where the running method of the device not subjected to the running control is changed, the device operation monitoring portion provides an instruction to the post-control electric power amount data generating portion to generate the running control information again.

13. A load controlling method comprising:
an information acquiring step of acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device;
a post-control electric power amount data generating step of generating plural pieces of running control information each indicating a changeable running method for each device on the basis of the control condition information acquired in the information acquiring step, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired in the information acquiring step;
a post-control hot water storage amount data generating step of generating plural items of post-control hot water storage amount data each indicating an accumulated amount of hot water for every specific time generated in a case where a fuel cell generates electric power on the basis of the plural items of post-control electric power amount data generated in the post-control electric power amount data generating step;
a hot water storage amount determining step of determining whether the accumulated amounts within the plural items of post-control hot water storage amount data generated in the post-control hot water storage amount data generating step exceed a specific heat capacity;
a reduction amount calculating step of calculating plural energy cost reduction amounts indicating respective differences between plural energy costs, incurred in response to the plural items of post-control hot water storage amount data determined as not exceeding the specific heat capacity in the hot water storage amount determining step and the plural items of post-control electric power amount data corresponding to the plural items of post-control hot water storage amount data, and an energy cost incurred in response to the amount of main electric power before the running method of the device is changed; and a running method determining step of determining, as the running method of the device, the running control information corresponding to a largest energy cost reduction amount, which is largest among the plural energy cost reduction amounts calculated in the reduction amount calculating step.

14. A computer-readable recording medium where a load controlling program is recorded, the load controlling program causing a computer to function as:

an information acquiring portion for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device;

a post-control electric power amount data generating portion for generating plural pieces of running control information each indicating a changeable running method for each device on the basis of the control condition information acquired by the information acquiring portion, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information acquired by the information acquiring portion;

a post-control hot water storage amount data generating portion for generating plural items of post-control hot water storage amount data each indicating an accumulated amount of hot water for every specific time generated in a case where a fuel cell generates electric power on the basis of the plural items of post-control electric power amount data generated by the post-control electric power amount data generating portion;

a hot water storage amount determining portion for determining whether the accumulated amounts within the plural items of post-control hot water storage amount data generated by the post-control hot water storage amount data generating portion exceed a specific heat capacity;

a reduction amount calculating portion for calculating plural energy cost reduction amounts indicating respective differences between plural energy costs, incurred in response to the plural items of post-control hot water storage amount data determined as not exceeding the specific heat capacity by the hot water storage amount determining portion and the plural items of post-control electric power amount data corresponding to the plural items of post-control hot water storage amount data, and an energy cost incurred in response to the amount of main electric power before the running method of the device is changed; and a running method determining portion for determining, as the running method of the device, the running control information corresponding to a largest energy cost reduction amount, which is largest among the plural energy cost reduction amounts calculated by the reduction amount calculating portion.

15. A load controlling circuit comprising:

a post-control electric power amount data generating circuit for acquiring an amount of main electric power indicating an amount of electric power for an entire unity using electric power, fuel cell operation information indicating an operation state of a fuel cell main body that supplies electric power and thermal energy, device operation information indicating an operation state of a device consuming at least one of the electric power and the thermal energy, and control condition information indicating a control condition for each device, generating plural pieces of running control information each indicating a changeable running method for each device on the basis of the control condition information that has been acquired, and generating plural items of post-control electric power amount data each indicating the amount of main electric power for every specific time obtained in a case where the running method of the device is changed in response to the plural pieces of running control information on the basis of the amount of main electric power, the fuel cell operation information, and the device operation information that have been acquired;

a post-control hot water storage amount data generating circuit for generating plural items of post-control hot water storage amount data each indicating an accumulated amount of hot water for every specific time generated in a case where a fuel cell generates electric power on the basis of the plural items of post-control electric power amount data generated by the post-control electric power amount data generating circuit;

a hot water storage amount determining circuit for determining whether the accumulated amounts within the plural items of post-control hot water storage amount data generated by the post-control hot water storage amount data generating circuit exceed a specific heat capacity;

a reduction amount calculating circuit for calculating plural energy cost reduction amounts indicating respective differences between plural energy costs, incurred in response to the plural items of post-control hot water storage amount data determined as not exceeding the specific heat capacity by the hot water storage amount determining circuit and the plural items of post-control electric power amount data corresponding to the plural items of post-control hot water storage amount data, and an energy cost incurred in response to the amount of main electric power before the running method of the device is changed; and a running method determining circuit for determining, as the running method of the device, the running control information corresponding to a largest energy cost reduction amount, which is largest among the plural energy cost reduction amounts calculated by the reduction amount calculating circuit.

* * * * *